US012615512B2

(12) United States Patent
Shi et al.

(10) Patent No.: US 12,615,512 B2
(45) Date of Patent: Apr. 28, 2026

(54) METHOD AND APPARATUS FOR DETECTING FALSE BASE STATION

(71) Applicant: HUAWEI TECHNOLOGIES CO., LTD., Shenzhen (CN)

(72) Inventors: Dai Shi, Shanghai (CN); Longhua Guo, Shanghai (CN); Xiaochun Xiong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 18/807,853

(22) Filed: Aug. 16, 2024

(65) Prior Publication Data

US 2024/0414009 A1     Dec. 12, 2024

Related U.S. Application Data

(63) Continuation of application No. PCT/CN2023/075033, filed on Feb. 8, 2023.

(30) Foreign Application Priority Data

Feb. 18, 2022     (CN) .......................... 202210148889.2

(51) Int. Cl.
| | |
|---|---|
| *H04W 12/122* | (2021.01) |
| *H04L 9/08* | (2006.01) |
| *H04L 9/32* | (2006.01) |
| *H04W 12/61* | (2021.01) |
| *H04W 74/0833* | (2024.01) |

(52) U.S. Cl.
CPC ......... *H04W 12/122* (2021.01); *H04L 9/0825* (2013.01); *H04L 9/3247* (2013.01);
(Continued)

(58) Field of Classification Search
CPC ............... H04W 12/122; H04W 12/61; H04W 74/0833; H04L 9/0825; H04L 9/3247; H04L 9/3297; H04L 2209/80
See application file for complete search history.

(56) References Cited

U.S. PATENT DOCUMENTS

| | | | |
|---|---|---|---|
| 12,137,176 B1 * | 11/2024 | Wan | ...................... H04L 9/3247 |
| 2015/0156760 A1 * | 6/2015 | Yu | ..................... H04W 72/0446 |
| | | | 370/329 |

(Continued)

FOREIGN PATENT DOCUMENTS

| | | |
|---|---|---|
| CN | 111065101 A | 4/2020 |
| CN | 111182548 A | 5/2020 |

(Continued)

OTHER PUBLICATIONS

First Office Action, CN 20221014889.2, Aug. 26, 2025 (Year: 2025).*

(Continued)

*Primary Examiner* — Robert B Leung
(74) *Attorney, Agent, or Firm* — Leydig, Voit & Mayer, Ltd.

(57) ABSTRACT

Embodiments of this application provide a method and an apparatus for detecting a false base station. The method includes: A network device sends system information to a terminal device, where the system information includes a first signature of the system information and a first time-stamp, and the first timestamp identifies time at which the network device generates the first signature. The network device receives private information from the terminal device. The network device signs the private information of the terminal device by using a private key corresponding to the network device, to obtain a second signature. The network sends the second signature to the terminal device. According to the foregoing method, the terminal device can accurately verify whether the terminal device is attacked by a false base station, to improve communication security.

16 Claims, 7 Drawing Sheets

(52) U.S. Cl.
CPC .......... *H04L 9/3297* (2013.01); *H04W 12/61* (2021.01); *H04W 74/0833* (2013.01); *H04L 2209/80* (2013.01)

(56) References Cited

U.S. PATENT DOCUMENTS

| | | | |
|---|---|---|---|
| 2017/0295489 A1 | 10/2017 | Agiwal et al. | |
| 2020/0178318 A1* | 6/2020 | Yu ......................... | H04W 76/11 |
| 2022/0086644 A1* | 3/2022 | Johansson ............. | H04L 9/3247 |

FOREIGN PATENT DOCUMENTS

| | | |
|---|---|---|
| CN | 112887971 A | 6/2021 |
| WO | 2009022880 A2 | 2/2009 |
| WO | 2019161545 A1 | 8/2019 |
| WO | 2020182271 A1 | 9/2020 |
| WO | 2020191782 A1 | 10/2020 |

OTHER PUBLICATIONS

European Search Opinion, EP 23755724, Apr. 7, 2025 (Year: 2025).*

Written Opinion of the International Searching Authority, PCT/CN2023/075033, Apr. 28, 2023 (Year: 2023).*

"3rd Generation Partnership Project; Technical Specification Group Services and System Aspects Study on 5G Security Enhancement against False Base Stations (FBS)(Release 17)," 3GPP TR 33.809 V0.17.0, Total 129 pages (Nov. 2021).

* cited by examiner

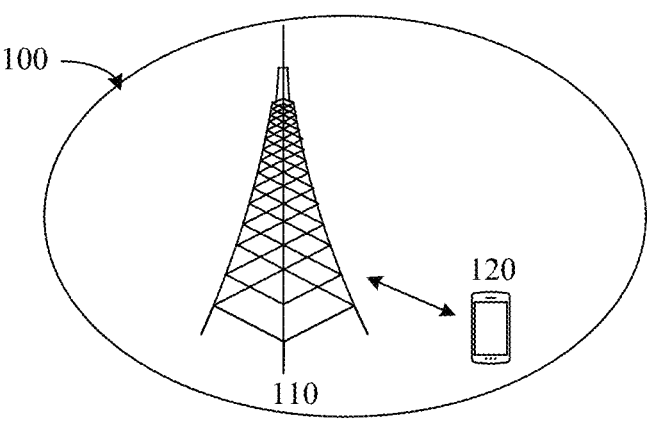
FIG. 1
200(a)
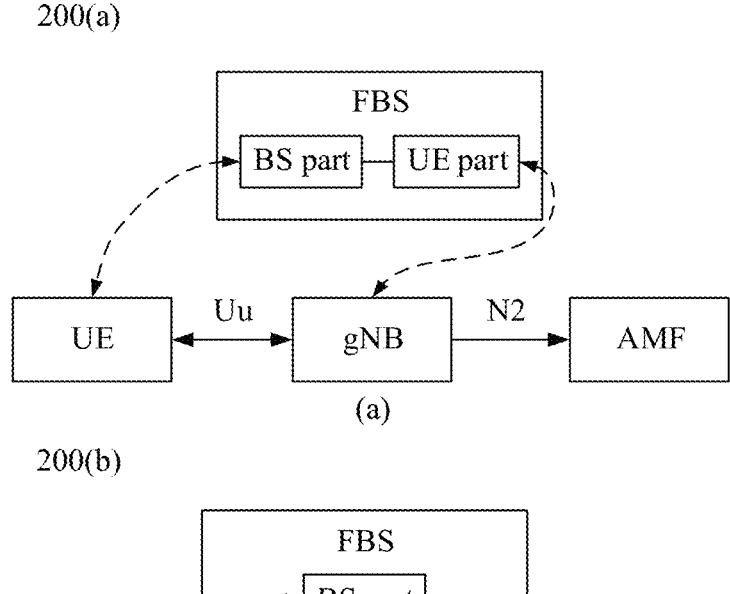
(a)
200(b)
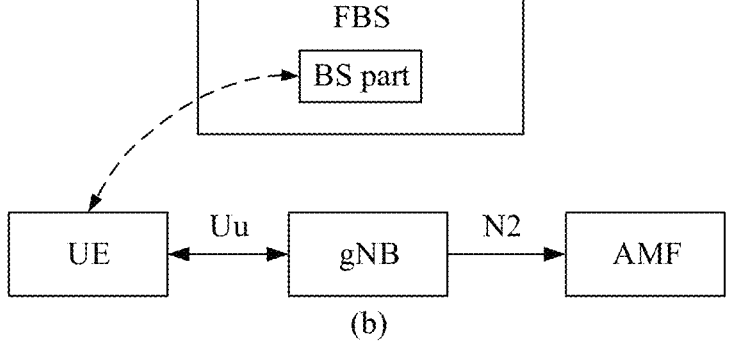
(b)
FIG. 2

300

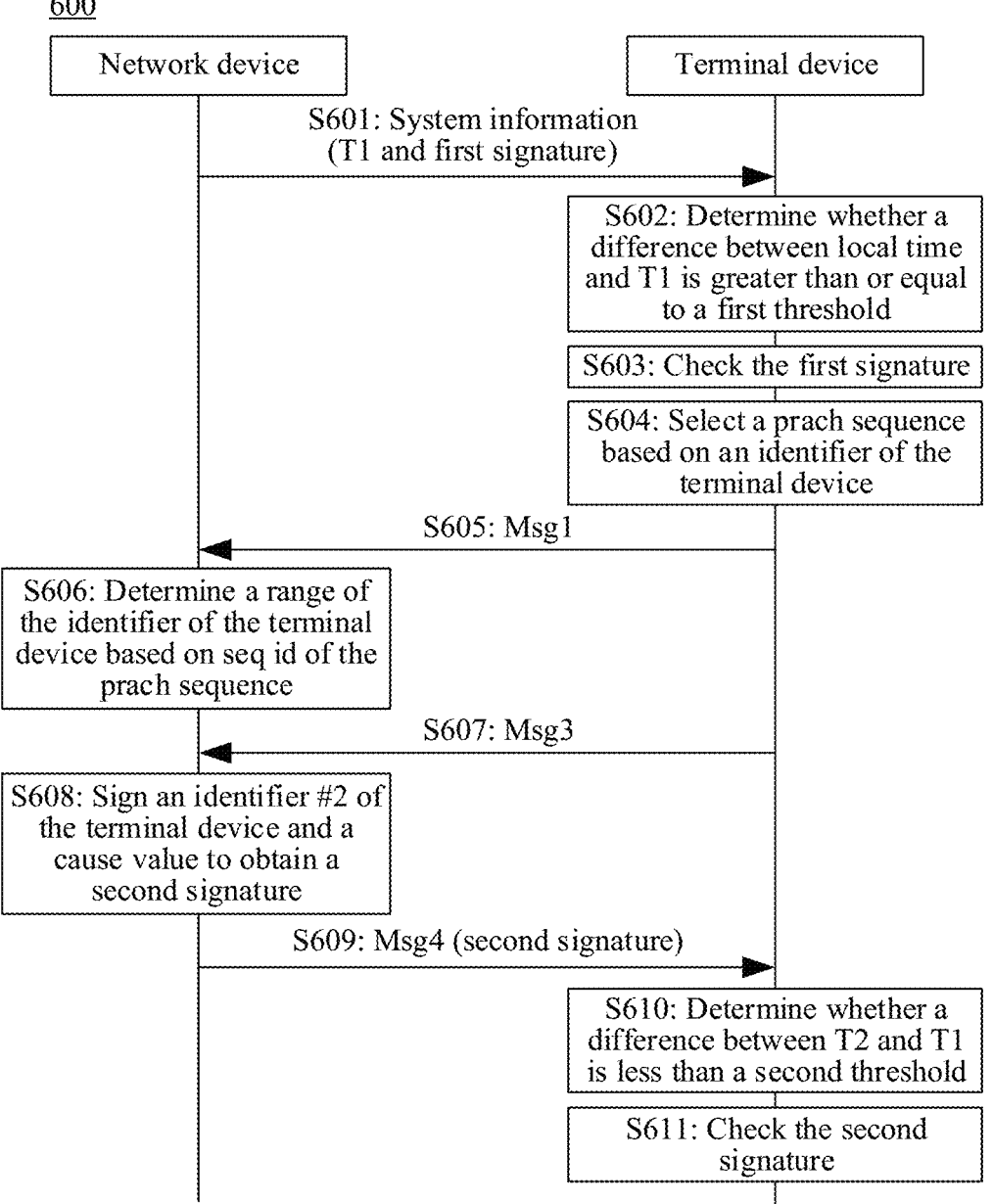

600

Network device                                    Terminal device

S601: System information
(T1 and first signature)

S602: Determine whether a
difference between local time
and T1 is greater than or equal
to a first threshold S603: Check the first signature S604: Select a prach sequence
based on an identifier of the
terminal device S605: Msg1

S606: Determine a range of
the identifier of the terminal
device based on seq id of the
prach sequence S607: Msg3

S608: Sign an identifier #2 of
the terminal device and a
cause value to obtain a
second signature S609: Msg4 (second signature)

S610: Determine whether a
difference between T2 and T1
is less than a second threshold S611: Check the second
signature

METHOD AND APPARATUS FOR DETECTING FALSE BASE STATION

CROSS-REFERENCE TO RELATED APPLICATIONS

This application is a continuation of International Application No. PCT/CN2023/075033, filed on Feb. 8, 2023, which claims priority to Chinese Patent Application No. 202210148889.2, filed on Feb. 18, 2022. The disclosures of the aforementioned applications are hereby incorporated by reference in their entireties.

TECHNICAL FIELD

This application relates to the communication field, and more specifically, to a method and an apparatus for detecting a false base station.

BACKGROUND

In a wireless communication system, when initially accessing a network, a terminal device obtains some basic information (for example, network information of a cell in which the terminal device is located, information about a registration area, information about a common channel, and information about another cell) of a network device by using system information (SI) broadcast by the network device, to complete a procedure of accessing the network device.

In an initial state, the network device does not know when the terminal device accesses the network device, and a security context cannot be established between the terminal device and the network device before a connection is established between the terminal device and the network device. Therefore, encrypted protection cannot be performed on the system information sent by the network device and some security problems may exist. For example, an unauthorized network device (also referred to as a false base station) may modify system information sent by an authorized network device, but the terminal device cannot identify validity of received system information.

SUMMARY

Embodiments of this application provide a method and an apparatus for detecting a false base station, to detect whether a system information sender is a false base station, so as to ensure communication security.

According to a first aspect, a method for detecting a false base station is provided. The method includes: a network device sends system information to a terminal device, where the system information includes a first signature of the system information and a first timestamp, and the first timestamp identifies time at which the network device generates the first signature. The network device receives private information from the terminal device. The network device signs the private information of the terminal device by using a private key corresponding to the network device, to obtain a second signature. The network sends the second signature to the terminal device.

Based on the foregoing solution, after receiving the private information from the terminal device, the network device may sign the private information to obtain the second signature, and send the second signature to the terminal device, so that the terminal device may check the second signature, and verify whether the network device is a false base station based on a check result, to ensure communication security and avoid a replay attack initiated by the false base station on the terminal device.

With reference to the first aspect, in some implementations of the first aspect, that the network device receives private information from the terminal device includes: The network device receives a message 3 from the terminal device, where the message 3 includes the private information of the terminal device.

Based on the foregoing solution, the network device may receive the private information of the terminal device from the terminal device by using the message 3 (Msg3). In other words, the terminal device may reuse the message 3 in a random access process to send the private information, to reduce signaling overheads.

With reference to the first aspect, in some implementations of the first aspect, the message 3 further includes indication information, and the indication information indicates that check performed by the terminal device on the first signature succeeds, but a difference between local time of the terminal device and the first timestamp is greater than or equal to a first threshold.

Based on the foregoing solution, the network device may further obtain the indication information from the message 3, and determine, by using the indication information, that check performed by the terminal device on the first signature succeeds, but the difference between the local time of the terminal device and the first timestamp is greater than or equal to the first threshold. Based on this, the network device signs the private information of the terminal device.

With reference to the first aspect, in some implementations of the first aspect, that the network device signs the private information of the terminal device by using a private key corresponding to the network device, to obtain a second signature includes: The network device signs the private information of the terminal device and one or more of identification information of the terminal device, a cell radio network temporary identifier, the indication information, and current system time of the network device by using the private key corresponding to the network device, to obtain the second signature.

Based on the foregoing solution, the network device may generate the second signature based on the private information of the terminal device and one or more other parameters, to ensure reliability of the second signature.

With reference to the first aspect, in some implementations of the first aspect, that the network device sends the second signature to the terminal device includes: The network device sends a message 4 to the terminal device, where the message 4 includes the second signature.

Based on the foregoing solution, the network device may send the second signature to the terminal device in the message 4 (Msg4). In other words, the network device may reuse the message 4 in the random access process of the terminal device to send the second signature to the terminal device, to reduce signaling overheads.

According to a second aspect, a method for detecting a false base station is provided. The method includes: a terminal device receives system information from a network device, where the system information includes a first signature of the system information and a first timestamp, and the first timestamp identifies time at which the network device generates the first signature. When the terminal device determines that a difference between local time and the first timestamp is greater than or equal to a first threshold and check on the first signature succeeds, the terminal device sends private information of the terminal device to the network device. The terminal device receives a second signature from the network device. The terminal device verifies whether a difference between a second timestamp and the first timestamp is less than a second threshold, where the second timestamp identifies time at which the terminal device receives the second signature. The terminal device checks the second signature by using the private information.

With reference to the second aspect, in some implementations of the second aspect, the method further includes: The terminal device determines, based on a verification result of the second timestamp and/or a check result of the second signature, whether the network device is a false base station, or whether the network device is under a replay attack.

Based on the foregoing solution, when the terminal device determines that the difference between the local time and the first timestamp is greater than or equal to the first threshold and the check on the first signature succeeds, the terminal device may further check the second timestamp and the second signature, to determine whether the network device is the false base station, or whether the network device is under the replay attack, to ensure communication security.

With reference to the second aspect, in some implementations of the second aspect, that the terminal device sends private information of the terminal device to the network device includes: The terminal device sends a message 3 to the network device, where the message 3 includes the private information of the terminal device.

Based on the foregoing solution, the terminal device may send the private information of the terminal device to the network device by using the message 3 (Msg3). In other words, the terminal device may reuse the message 3 in a random access process to send the private information, to reduce signaling overheads.

With reference to the second aspect, in some implementations of the second aspect, the message 3 further includes indication information, and the indication information indicates that check performed by the terminal device on the first signature succeeds, but the difference between the local time of the terminal device and the first timestamp is greater than or equal to the first threshold.

Based on the foregoing solution, the terminal device may further include the indication information in the message 3, so that the network device may determine, by using the indication information, that check performed by the terminal device on the first signature succeeds, but the difference between the local time of the terminal device and the first timestamp is greater than or equal to the first threshold.

With reference to the second aspect, in some implementations of the second aspect, that the terminal device receives a second signature from the network device includes: The terminal device receives a message 4 from the network device, where the message 4 includes the second signature.

Based on the foregoing solution, the terminal device may receive the second signature from the network device in the message 4 (Msg4). In other words, the network device may reuse the message 4 in the random access process of the terminal device to send the second signature to the terminal device, to reduce signaling overheads.

With reference to the second aspect, in some implementations of the second aspect, that the terminal device checks the second signature by using the private information includes: The terminal device checks the second signature by using the private information and one or more of identification information of the terminal device, a cell radio network temporary identifier, the indication information, and current system time.

Based on the foregoing solution, the second signature may be generated based on the private information of the terminal device and one or more other optional parameters, to ensure reliability of the second signature.

With reference to the second aspect, in some implementations of the second aspect, that the terminal device checks the second signature by using the private information includes: When the difference between the second timestamp and the first timestamp is less than the second threshold, the terminal device checks the second signature by using the private information.

Based on the foregoing solution, the terminal device checks the second signature only when the difference between the second timestamp and the first timestamp is less than the second threshold. In other words, when the difference between the second timestamp and the first timestamp is greater than or equal to the second threshold (in other words, the terminal device cannot receive the second signature within predetermined time), the terminal device may not check the second signature, to save resources.

With reference to the second aspect, in some implementations of the second aspect, the method further includes: When the difference between the second timestamp and the first timestamp is greater than or equal to the second threshold and/or the check on the second signature fails, the terminal device determines that the network device is the false base station.

Based on the foregoing solution, the terminal device may determine, based on the check result of the second timestamp and/or the second signature, whether the network device is the false base station, to ensure communication security and avoid the replay attack from the false base station.

According to a third aspect, a method for detecting a false base station is provided. The method includes: a network device sends system information to a terminal device, where the system information includes a first signature of the system information, a first timestamp, and a correspondence between a terminal identifier range and a selection range of a physical random access channel sequence, and the first timestamp identifies time at which the network device generates the first signature. The network device receives a message 1 from the terminal device. The network device determines a terminal identifier range corresponding to the terminal device based on an identifier of a physical random access channel sequence corresponding to the message 1 and the correspondence between the terminal identifier range and the selection range of the physical random access channel sequence. The network device signs an identifier of the terminal device and current system time by using a private key corresponding to the network device, to obtain a second signature, where the identifier of the terminal device is determined based on the terminal identifier range corresponding to the terminal device. The network device sends the second signature to the terminal device.

Based on the foregoing solution, the network device may determine the terminal identifier range corresponding to the terminal device based on the identifier of the physical random access channel sequence corresponding to the message 1 from the terminal device, to sign the identifier of the terminal device and the current system time to obtain the second signature and send the second signature to the terminal device, so that the terminal device may check the second signature, and verify, based on a check result, whether the network device is a false base station, to ensure communication security and avoid a replay attack initiated by the false base station on the terminal device.

With reference to the third aspect, in some implementations of the third aspect, the method further includes: The network device receives a message 3 from the terminal device, where the message 3 includes indication information, and the indication information indicates that check performed by the terminal device on the first signature succeeds, but a difference between local time of the terminal device and the first timestamp is greater than or equal to a first threshold.

Based on the foregoing solution, the network device may further obtain the indication information from the message 3, and determine, by using the indication information, that check performed by the terminal device on the first signature succeeds, but the difference between the local time of the terminal device and the first timestamp is greater than or equal to the first threshold. Based on this, the network device signs private information of the terminal device.

With reference to the third aspect, in some implementations of the third aspect, that the network device signs an identifier of the terminal device and current system time by using a private key corresponding to the network device, to obtain a second signature includes: The network device signs the identifier of the terminal device, the current system time, and the indication information by using the private key corresponding to the network device, to obtain the second signature.

Based on the foregoing solution, the network device may generate the second signature based on the private information of the terminal device and one or more other parameters, to ensure reliability of the second signature.

With reference to the third aspect, in some implementations of the third aspect, that the network device sends the second signature to the terminal device includes: The network device sends a message 4 to the terminal device, where the message 4 includes the second signature.

Based on the foregoing solution, the network device may send the second signature to the terminal device in the message 4 (Msg4). In other words, the network device may reuse the message 4 in a random access process of the terminal device to send the second signature to the terminal device, to reduce signaling overheads.

According to a fourth aspect, a method for detecting a false base station is provided. The method includes: a terminal device receives system information from a network device, where the system information includes a first signature of the system information, a first timestamp, and a correspondence between a terminal identifier range and a selection range of a physical random access channel sequence, and the first timestamp identifies time at which the network device generates the first signature. When the terminal device determines that a difference between local time and the first timestamp is greater than or equal to a first threshold and check on the first signature succeeds, the terminal device selects a physical random access channel sequence based on an identifier of the terminal device and the correspondence between the terminal identifier range and the selection range of the physical random access channel sequence. The terminal device sends a message 1 to the network device based on the selected physical random access channel sequence. The terminal device receives a second signature from the network device. The terminal device verifies whether a difference between a second timestamp and the first timestamp is less than a second threshold, where the second timestamp identifies time at which the terminal device receives the second signature. The terminal device checks the second signature by using the identifier of the terminal device and current system time, where the identifier of the terminal device is determined based on a terminal identifier range corresponding to the identifier of the terminal device.

With reference to the fourth aspect, in some implementations of the fourth aspect, the method further includes: The terminal device determines, based on a verification result of the second timestamp and/or a check result of the second signature, whether the network device is a false base station, or whether the network device is under a replay attack.

Based on the foregoing solution, when the terminal device determines that the difference between the local time and the first timestamp is greater than or equal to the first threshold and the check on the first signature succeeds, the terminal device may select the physical random access channel sequence based on a description of the terminal device and the correspondence between the terminal identifier range and the selection range of the physical random access channel sequence, and send the message 1 to the network device by using the selected physical random access channel sequence, so that the network device may determine, based on the message 1, the terminal identifier range to which the identifier of the terminal device belongs. Further, the terminal device may further check the second timestamp and the second signature, to determine whether the network device is the false base station, or whether the network device is under the replay attack, to ensure communication security.

With reference to the fourth aspect, in some implementations of the fourth aspect, the method further includes: The terminal device sends a message 3 to the network device, where the message 3 includes indication information, and the indication information indicates that check performed by the terminal device on the first signature succeeds, but the difference between the local time of the terminal device and the first timestamp is greater than or equal to the first threshold.

Based on the foregoing solution, the terminal device may send private information of the terminal device to the network device by using the message 3 (Msg3). In other words, the terminal device may reuse the message 3 in a random access process to send the private information, to reduce signaling overheads.

With reference to the fourth aspect, in some implementations of the fourth aspect, that the terminal device checks the second signature by using the identifier of the terminal device includes: The terminal device checks the second signature by using the identifier of the terminal device, the current system time, and the indication information.

Based on the foregoing solution, the second signature may be generated based on the private information of the terminal device and one or more other optional parameters, to ensure reliability of the second signature.

With reference to the fourth aspect, in some implementations of the fourth aspect, that the terminal device receives a second signature from the network device includes: The terminal device receives a message 4 from the network device, where the message 4 includes the second signature.

Based on the foregoing solution, the terminal device may receive the second signature from the network device in the message 4 (Msg4). In other words, the network device may reuse the message 4 in the random access process of the terminal device to send the second signature to the terminal device, to reduce signaling overheads.

According to a fifth aspect, an apparatus for detecting a false base station is provided. The apparatus includes: a transceiver module, configured to send system information to a terminal device, where the system information includes a first signature of the system information and a first timestamp, and the first timestamp identifies time at which the apparatus generates the first signature, where the transceiver module is further configured to receive private information from the terminal device; and a processing module, configured to sign the private information of the terminal device by using a private key corresponding to the network device, to obtain a second signature, where the transceiver module is further configured to send the second signature to the terminal device.

With reference to the fifth aspect, in some implementations of the fifth aspect, the transceiver module is specifically configured to receive a message 3 from the terminal device, where the message 3 includes the private information of the terminal device.

With reference to the fifth aspect, in some implementations of the fifth aspect, the message 3 further includes indication information, and the indication information indicates that check performed by the terminal device on the first signature succeeds, but a difference between local time of the terminal device and the first timestamp is greater than or equal to a first threshold.

With reference to the fifth aspect, in some implementations of the fifth aspect, the processing module is specifically configured to sign the private information of the terminal device, and one or more of identification information of the terminal device, a cell radio network temporary identifier, the indication information, and current system time of the apparatus by using the private key corresponding to the apparatus, to obtain the second signature.

With reference to the fifth aspect, in some implementations of the fifth aspect, the transceiver module is specifically configured to send, by the network device, a message 4 to the terminal device, where the message 4 includes the second signature.

According to a sixth aspect, an apparatus for detecting a false base station is provided. The apparatus includes a transceiver module, configured to receive system information from a network device, where the system information includes a first signature of the system information and a first timestamp, and the first timestamp identifies time at which the network device generates the first signature, where the transceiver module is further configured to: when the apparatus determines that a difference between local time and the first timestamp is greater than or equal to a first threshold and check on the first signature succeeds, send private information of the terminal device to the network device; and receive a second signature from the network device; and a processing module, configured to verify whether a difference between a second timestamp and the first timestamp is less than a second threshold, where the second timestamp identifies time at which the terminal device receives the second signature; and check the second signature by using the private information.

With reference to the sixth aspect, in some implementations of the sixth aspect, the processing module is specifically configured to send a message 3 to the network device, where the message 3 includes the private information of the terminal device.

With reference to the sixth aspect, in some implementations of the sixth aspect, the message 3 further includes indication information, and the indication information indicates that check performed by the terminal device on the first signature succeeds, but the difference between the local time of the terminal device and the first timestamp is greater than or equal to the first threshold.

With reference to the sixth aspect, in some implementations of the sixth aspect, the processing module is specifically configured to receive a message 4 by the terminal device from the network device, where the message 4 includes the second signature.

With reference to the sixth aspect, in some implementations of the sixth aspect, the processing module is specifically configured to check the second signature by using the private information and one or more of identification information of the apparatus, a cell radio network temporary identifier, the indication information, and current system time.

With reference to the sixth aspect, in some implementations of the sixth aspect, the processing module is specifically configured to: when the difference between the second timestamp and the first timestamp is less than the second threshold, check the second signature by using the private information.

With reference to the sixth aspect, in some implementations of the sixth aspect, the processing module is further configured to: when the difference between the second timestamp and the first timestamp is greater than or equal to the second threshold and/or the check on the second signature fails, determine that the network device is a false base station.

According to a seventh aspect, an apparatus for detecting a false base station is provided. The apparatus includes: a transceiver module, configured to send system information to a terminal device, where the system information includes a first signature of the system information, a first timestamp, and a correspondence between a terminal identifier range and a selection range of a physical random access channel sequence, and the first timestamp is used to identify a time at which a network device generates the first signature; and receive a message 1 from the terminal device; and a processing module, configured to determine a terminal identifier range corresponding to the terminal device based on an identifier of a physical random access channel sequence corresponding to the message 1 and the correspondence between the terminal identifier range and the selection range of the physical random access channel sequence; and sign an identifier of the terminal device and current system time by using a private key corresponding to the network device, to obtain a second signature, where the identifier of the terminal device is determined based on the terminal identifier range corresponding to the terminal device, where the transceiver module is further configured to send the second signature to the terminal device.

With reference to the seventh aspect, in some implementations of the seventh aspect, the transceiver module is further configured to receive a message 3 from the terminal device, where the message 3 includes indication information, and the indication information indicates that check performed by the terminal device on the first signature succeeds, but a difference between local time of the terminal device and the first timestamp is greater than or equal to a first threshold.

With reference to the seventh aspect, in some implementations of the seventh aspect, the processing module is specifically configured to sign the identifier of the terminal device, the current system time, and the indication information by using the private key corresponding to the network device, to obtain the second signature.

With reference to the seventh aspect, in some implementations of the seventh aspect, the transceiver module is specifically configured to send a message 4 to the terminal device, where the message 4 includes the second signature.

According to an eighth aspect, an apparatus for detecting a false base station is provided. The apparatus includes: a transceiver module, configured to receive system information from a network device, where the system information includes a first signature of the system information, a first timestamp, and a correspondence between a terminal identifier range and a selection range of a physical random access channel sequence, and the first timestamp identifies time at which the network device generates the first signature; a processing module, configured to: when it is determined that a difference between local time and the first timestamp is greater than or equal to a first threshold and check on the first signature succeeds, select a physical random access channel sequence based on an identifier of the apparatus and the correspondence between the terminal identifier range and the selection range of the physical random access channel sequence; and send a message 1 to the network device based on the selected physical random access channel sequence, where the transceiver module is further configured to receive a second signature from the network device; and the processing module is further configured to verify whether a difference between a second timestamp and the first timestamp is less than a second threshold, where the second timestamp identifies time at which a terminal device receives the second signature; and check the second signature by using the identifier of the apparatus and current system time, where the identifier of the apparatus is determined based on a terminal identifier range corresponding to the identifier of the apparatus.

With reference to the eighth aspect, in some implementations of the eighth aspect, the transceiver module is further configured to send a message 3 to the network device, where the message 3 includes indication information, and the indication information indicates that check performed by the terminal device on the first signature succeeds, but the difference between the local time of the apparatus and the first timestamp is greater than or equal to the first threshold.

With reference to the eighth aspect, in some implementations of the eighth aspect, the processing module is specifically configured to check, by the terminal device, the second signature by using the identifier of the terminal device, the current system time, and the indication information.

With reference to the eighth aspect, in some implementations of the eighth aspect, the transceiver module is specifically configured to receive a message 4 from the network device, where the message 4 includes the second signature.

According to a ninth aspect, an apparatus for detecting a false base station is provided. The apparatus may be a network device, or may be a chip in the network device. The apparatus has a function of implementing any one of the implementations in the first aspect or the third aspect. The function may be implemented by hardware, or may be implemented by hardware executing corresponding software. The hardware or the software includes one or more modules corresponding to the function.

According to a tenth aspect, an apparatus for detecting a false base station is provided. The apparatus may be a terminal device, or may be a chip in the terminal device. The apparatus has a function of implementing any one of the implementations in the second aspect or the fourth aspect. The function may be implemented by hardware, or may be implemented by hardware executing corresponding software. The hardware or the software includes one or more modules corresponding to the function.

According to an eleventh aspect, an apparatus for detecting a false base station is provided. The apparatus for detecting a false base station includes a processor, configured to implement a function of the network device in the method described in the first aspect or the third aspect, or a function of the terminal device in the method described in the second aspect or the fourth aspect.

In an implementation, the apparatus for detecting a false base station may further include a memory, the memory is coupled to the processor, and the processor is configured to implement the function of the network device in the method described in the first aspect or the third aspect or the function of the terminal device in the method described in the second aspect or the fourth aspect.

In an implementation, the memory is configured to store program instructions and data. The memory is coupled to the processor. The processor may invoke and execute the program instructions stored in the memory, to implement the function of the network device in the method described in the first aspect or the third aspect, or the function of the terminal device in the method described in the second aspect or the third aspect.

In an implementation, the apparatus for detecting a false base station may further include a communication interface, and the communication interface is used by the apparatus for obtaining data to communicate with another device. The communication interface may be a transceiver, an input/output interface, a circuit, or the like.

In an implementation, the apparatus for detecting a false base station includes a processor and a communication interface. The processor is configured to run a computer program, so that the apparatus for detecting a false base station implements any method described in any one of the first aspect to the fourth aspect. The processor communicates with outside through the communication interface. It may be understood that the outside may be an object other than the processor or an object other than the apparatus.

In another implementation, the apparatus for obtaining the data is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a twelfth aspect, this application provides a computer-readable storage medium. The computer-readable storage medium stores instructions, and when the instructions are run on a computer, the computer is enabled to perform the methods in the foregoing aspects.

According to a thirteenth aspect, this application provides a computer program product that includes instructions. When the computer program product runs on a computer, the computer is enabled to perform the methods in the foregoing aspects.

According to a fourteenth aspect, a communication system is provided, including the network device shown in the first aspect and the terminal device shown in the second aspect.

According to a fifteenth aspect, a communication system is provided, including the network device shown in the third aspect and the terminal device shown in the fourth aspect.

According to a sixteenth aspect, a chip or a chip system is provided. The chip or the chip system includes at least one processor and a communication interface. The communication interface and the at least one processor are interconnected through a line. The at least one processor is configured to run a computer program or instructions, to perform the method in any possible implementation of the first aspect to the fourth aspect. The communication interface in the chip may be an input/output interface, a pin, a circuit, or the like.

In an implementation, the chip or the chip system described above in this application further includes at least one memory, and the at least one memory stores instructions. The memory may be a storage unit inside the chip, for example, a register or a cache, or may be a storage unit (for example, a read-only memory or a random access memory) of the chip.

BRIEF DESCRIPTION OF DRAWINGS

FIG. 1 is a diagram of an architecture of a communication system to which an embodiment of this application is applicable;

FIG. 2 shows diagrams of two possible architectures of a false base station;

FIG. 6 is a schematic flowchart of another method for detecting a false base station according to an embodiment of this application;

DESCRIPTION OF EMBODIMENTS

Figure 3:
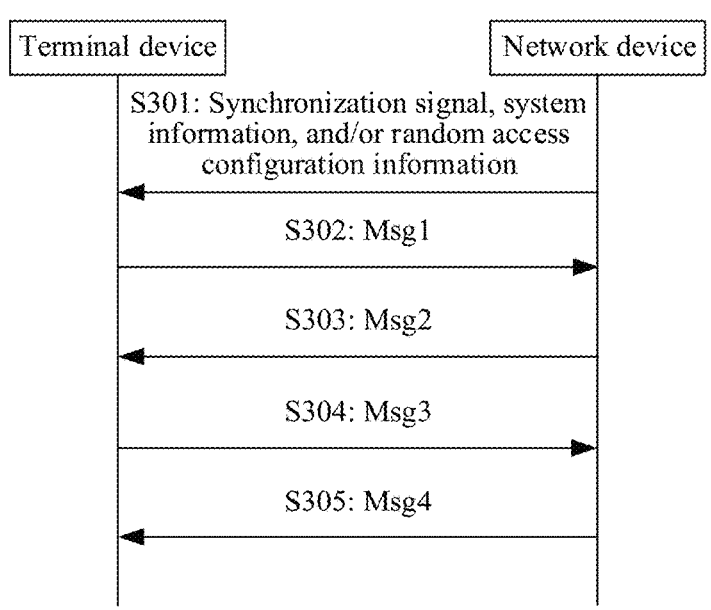
FIG. 3 is a diagram of a random access procedure.

To make the objectives, technical solutions, and advantages of this application clearer, the following describes the technical solutions in this application with reference to the accompanying drawings. A specific operation method in a method embodiment may also be applied to an apparatus embodiment or a system embodiment. In the descriptions of this application, unless otherwise specified, "a plurality of" means two or more than two.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In the specification, the claims, and the accompanying drawings of this application, the terms "first", "second", "third", "fourth", and various other ordinal number terms (if existent) are intended to distinguish between similar objects but do not necessarily indicate a specific order or sequence. It may be understood that various numerals used in this application are merely differentiated for ease of description, but are not used to limit the scope of this application. Sequence numbers of the foregoing processes do not mean an execution sequence, and the execution sequence of the processes should be determined based on functions and internal logic of the processes. It should be understood that the data termed in such a way are interchangeable in proper circumstances so that embodiments of the present invention described herein can be implemented in other orders than the order illustrated or described herein. In addition, the terms "include" and "have" and any other variants are intended to cover a non-exclusive inclusion. For example, a process, a method, a system, a product, or a device that includes a list of steps or units is not necessarily limited to those expressly listed steps or units, but may include other steps or units not expressly listed or inherent to such a process, method, product, or device.

The technical solutions in embodiments of this application may be applied to various communication systems, for example, a long term evolution (LTE) system, an LTE frequency division duplex (FDD) system, an LTE time division duplex (TDD) system, a worldwide interoperability for microwave access (WiMAX) communication system, a 5th generation (5G) system, a new radio (NR) system, or a future network. The 5G mobile communication system in this application includes a non-standalone (NSA) 5G mobile communication system or a standalone (SA) 5G mobile communication system. The technical solutions provided in this application may be further applied to a future communication system, for example, a 6th generation mobile communication system. Alternatively, the communication system may be a public land mobile network (PLMN), a device-to-device (D2D) communication system, a machine to machine (machine to machine, M2M) communication system, an internet of things (IoT) communication system, or another communication system.

A terminal device in embodiments of this application may be an access terminal, a subscriber unit, a subscriber station, a mobile station, a relay station, a remote station, a remote terminal, a mobile device, a user terminal, user equipment (UE), a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile communication network (PLMN), a terminal device in a future internet of vehicles, or the like. This is not limited in embodiments of this application.

By way of example but not limitation, in embodiments of this application, the wearable device may also be referred to as a wearable intelligent device, and is a general name of a wearable device developed by intelligently designing daily wear through a wearable technology, such as glasses, gloves, watches, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, intelligent wearable devices include full-featured and large-size devices that can implement complete or partial functions without depending on smartphones, for example, smart watches or smart glasses, and devices that dedicated to only one type of application and need to be used together with other devices such as smartphones, such as various smart bands or smart jewelry used for monitoring physical signs.

In addition, the terminal device in embodiments of this application may alternatively be a terminal device in an IoT system. An IoT is an important part of future development of information technologies. A main technical feature of the IoT is connecting a thing to a network through a communication technology, to implement an intelligent network for interconnection between a person and a machine or between one thing and another. In embodiments of this application, an IOT technology may implement massive connections, deep coverage, and terminal power saving by using, for example, a narrowband (NB) technology.

In addition, in embodiments of this application, the terminal device may further include a sensor such as an intelligent printer, a train detector, and a gas station. Main functions of the terminal device include collecting data (some terminal devices), receiving control information and downlink data of the network device, sending an electromagnetic wave, and transmitting uplink data to the network device.

The network device in embodiments of this application may be any communication device that has a wireless transceiver function and that is configured to communicate with the terminal device. The device includes but is not limited to an evolved NodeB (eNB), a radio network controller (RNC), a NodeB (NB), a home NodeB (home evolved NodeB, HeNB, or HNB), a baseband unit (BBU), an access point (AP) in a wireless fidelity (Wi-Fi) system, a wireless relay node, a wireless backhaul node, a transmission point (TP), a transmission reception point (TRP), a 5G system, for example, a gNB in an NR system, or a transmission point (TRP or TP), one or a group of antenna panels (including a plurality of antenna panels) of a base station in a 5G system, or a network node that constitutes a gNB or a transmission point, for example, a baseband unit (BBU) or a distributed unit (DU).

In some deployments, the network device in embodiments of this application may be a central unit (CU) or a distributed unit (DU), or the network device includes a CU or a DU. The gNB may further include an active antenna unit ( ). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (core network, CN). This is not limited in this application. Further, the CU may be divided into a control plane central unit (CU-CP) and a user plane central unit (CU-UP). The CU-CP and the CU-UP may also be deployed on different physical devices. The CU-CP is responsible for a control plane function, and mainly includes the RRC layer and a PDCP—C layer. The PDCP-C layer is mainly responsible for data encryption and decryption, integrity protection, a data transmission, and the like on a control plane. The CU-UP is responsible for a user plane function, and mainly includes an SDAP layer and a PDCP-U layer. The SDAP layer is mainly responsible for processing data of a core network and mapping a flow (flow) to a bearer. The PDCP-U layer is mainly responsible for at least one function of encryption and decryption, integrity protection, header compression, serial number maintenance, a data transmission, and the like on a data plane. Specifically, the CU-CP and the CU-UP are connected through a communication interface (for example, an E1 interface). The CU-CP represents the network device and is connected to a core network device through a communication interface (for example, an Ng interface), and is connected to the DU through a communication interface (for example, an F1-C (control plane) interface). The CU-UP is connected to the DU through a communication interface (for example, an F1-U (user plane) interface). In another possible implementation, the PDCP—C layer is also included in the CU-UP. It may be understood that the foregoing protocol layer division between the CU and the DU, and protocol layer division between the CU-CP and the CU-UP are merely examples, and there may be another division manner. This is not limited in embodiments of this application.

The network device mentioned in embodiments of this application may be a device including the CU or the DU, or a device including the CU and the DU, or a device including a control plane CU node (a CU-CP node), a user plane CU node (a CU-UP node), and the DU node.

The network device and the terminal device may be deployed on land, including an indoor or outdoor device, a handheld device, or a vehicle-mounted device; or may be deployed on a water surface; or may be deployed on a plane, a balloon, or a satellite in the air. Scenarios in which network device and the terminal device are located are not limited in embodiments of this application.

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing by using a process, for example, a Linux operating system, a Unix operating system, an Android operating system, an iOS operating system, or a windows operating system. The application layer includes applications such as a browser, an address book, word processing software, and instant messaging software.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include, but is not limited to: a magnetic storage device (for example, a hard disk drive, a floppy disk, or a magnetic tape), an optical disc (for example, a compact disc (CD), a digital versatile disc (DVD), or the like), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

For ease of understanding of embodiments of this application, a communication system shown in FIG. 1 is first used as an example to describe in detail a communication system to which embodiments of this application are applicable. FIG. 1 is a diagram of a communication system 100 to which a method according to an embodiment of this application is applicable. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 and the terminal device 120 may communicate with each other through a radio link. A plurality of antennas may be configured for each communication device, for example, the network device 110 or the terminal device 120. For each communication device in the communication system 100, the plurality of configured antennas may include at least one transmit antenna configured to send a signal and at least one receive antenna configured to receive a signal. Therefore, the communication devices in the communication system 100, for example, the network device 110 and the terminal device 120, may communicate with each other by using a multi-antenna technology.

It should be understood that FIG. 1 is only a simplified diagram of an example for ease of understanding. The communication system 100 may further include another network device or another terminal device, which is not shown in FIG. 1.

For ease of understanding of embodiments of this application, several basic concepts in embodiments of this application are briefly described. It should be understood that basic concepts described below are briefly described by using basic concepts specified in an NR protocol as an example, but embodiments of this application are not limited to being applied only to an NR system. Therefore, standard names appearing when the NR system is used as an example for description are all functional descriptions, and specific names are not limited, indicate only functions of a device, and may be correspondingly extended to another system, for example, a 2G, 3G, 4G, or future communication system.

1. False Base Station

The false base station (FBS) is an apparatus commonly used by an attacker to attack communication security. The attacker may deploy the false base station to attract a terminal device to camp on the false base station. The false base station may be disguised as a cell of a nearby real base station to approach a terminal and broadcast system information. The false base station may change a cell selection message in a SIB 1 in the system information, so that the terminal can camp on the false base station more easily.

FIG. 2 shows two possible forms of a false base station. (a) in FIG. 2 shows a possible form of the false base station. In this form, the false base station includes a base station part (BS part) and a UE part. The base station part is used to attract the terminal to camp on a cell of the false base station, and the UE part is used to access a real base station as real UE, and communicate with an AMF by using an N2 protocol. In this manner, the attacker may sniff, tamper with, or forge communication content between a real terminal and a network through the false base station. This type of false base station may also be referred to as a man-in-the-middle false base station (man-in-the-middle false base station, MitM-FBS). (b) in FIG. 2 shows the other possible form of the false base station. In this form, the false base station includes only a base station part, and the false base station attracts the terminal to camp on the false base station through the base station part. Once the terminal camps on the false base station, the false base station may initiate a deny of service (DoS) attack on the terminal.

2. System Information

The system information may be a message sent by a network device to a terminal device in a cell in a wireless communication system. The message may include cell-level information of the cell, and is valid for all terminal devices in the cell. Usually, the network device may send the system information in a broadcast manner. Alternatively, the system information may alternatively be a message sent by a scheduling group header on a sidelink resource to a terminal device served by the scheduling group header. The message may include information about an area served by the scheduling group header. In this case, for a terminal device in a scheduling group, a function of the scheduling group header is similar to a function of the network device. Usually, the scheduling group header may send the system information in a broadcast manner.

For example, the system information may include one master information block (MIB) and at least one system information block (SIB). A SIB 1 includes information needed for the terminal device to access the cell and scheduling information of another SIB. Usually, when receiving the system information, the terminal device may first receive the MIB, then receive the SIB 1, and then receive other information (for example, a SIB 2 and a SIB 3) in the system information.

It should be understood that the system information in embodiments of this application may be understood as a broadcast message that is delivered by the network device and on which no encrypted protection is performed, and includes but is not limited to the foregoing MIB and SIB (for example, the SIB 1, the SIB 2, the SIB 3, . . . ). For example, the system information may alternatively be a paging (paging) message.

3. Identity-Based Signature

An identity-based signature technology is an asymmetric cryptography technology. Keys involved in the asymmetric cryptography technology include two parts: an identity-based public key and a private key. However, different from a conventional public key, a basic characteristic of the identity-based public key is a string of meaningful digits or a character string, for example, a telephone number or an email. In a conventional public key system, a private key is usually generated by a user or a device, and a public key is signed by a certificate authority (CA) to form a certificate. In an identity-based signature system, a conventional CA is replaced by a key generation center ( ). The key center generates a global public key and a global private key. When the user needs to generate an identity-based key, the user provides an identity of the user for the key center. The key center generates a private key for the user based on the identity of the user and the global public key or private key, and sends the identity, the global public key, and the private key to the user. Then, the user can use the private key for signing or decryption.

4. Replay Attack

The replay attack, also referred to as a playback attack, means that an attacker sends a packet that has been received by a destination host to deceive a system, and is mainly used to damage authentication correctness in an identity authentication process. The replay attack can be performed by an initiator or by an adversary who intercepts and retransmits data. The attacker steals an authentication credential through network monitoring or in other manners, and then sends the authentication credential to an authentication server again. The replay attack may occur in any network communication process, and is one of attack modes commonly used by hackers in a computer world.

5. Digital Signature

The digital signature, also referred to as a public key digital signature, or referred to as a signature for short, is a digital string generated by an information sender. The digital string is a valid proof of authenticity of information sent by the information sender. The digital signature is similar to a common physical signature written on paper, but is implemented by using a technology in the public key encryption field, and is a method used to identify digital information. A set of digital signatures usually defines two complementary operations, one is used for signing, and the other is used for verification. The digital signature is application of an asymmetric key cryptography technology and a digital digest technology.

Signature check means that an information receiver uses a public key to verify whether data or a file released by a private key holder is complete and whether an information source is accurate. For example, the private key holder encrypts to-be-sent data (or digest information of the to-be-sent data) by using the private key, and then sends the to-be-sent data and a ciphertext to the receiver, where the ciphertext is a signature of the data. The receiver decrypts the ciphertext by using the public key, and verifies whether data obtained through decryption is consistent with the data (or digest information generated based on the received data) received by the receiver from the private key holder. If the data is consistent, the verification succeeds, indicating that the received data information is complete and accurate, and it may be determined that the data is sent by the private key holder.

6. Random Access (RA)

The random access is an information exchange mechanism (or process) for establishing a connection between a network and a device that does not access the network in a communication system with access control, for example, an LTE system or a 5G system. Because a random access signal is carried by a random access channel (random access channel, RACH), the RA and the RACH are usually used together in protocols and spoken language.

The random access is classified into contention-based random access and non-contention-based random access. The contention-based random access usually includes four steps, and each step corresponds to one message. A message 1 (Msg1), a message 2 (Msg2), a message 3 (Msg3), and a message 4 (Msg4) are included, and respectively carry different signaling or information. The non-contention-based random access includes only the first two steps. In addition, to reduce access time of the four-step contention-based random access, two-step random access is further provided. The two-step random access includes a message A and a message B. The message A includes a preamble and a first piece of data information (similar to the message 1 and the message 3 in the four-step random access), and the message B includes contention resolution and uplink scheduling (similar to the message 2 and the message 4 in the four-step random access).

7. Four-Step Random Access (4-Step RA)

One random access mode is the four-step random access. The four-step random access is merely used to represent a name of a random access mode, and a specific name of the four-step random access does not constitute a limitation on the scope of embodiments of this application. Four-step information exchange (including a Msg1, a Msg2, a Msg3, and a Msg4) needs to be performed between a terminal device and a network device. FIG. 3 shows a basic procedure 300 of a four-step random access process. The following describes the procedure 300 by using an example.

S301: The network device sends a synchronization signal, system information, and/or random access configuration information to the terminal device.

Before the four-step random access process, the network device sends the synchronization signal and the system information at a specific location in a broadcast manner. In NR, a synchronization signal sent by a base station is referred to as a synchronization/broadcast signal block (SSB) (also represented as an SS/PBCH block). The SSB and the system information are periodically sent by the network device based on a configuration.

Optionally, the network device may further send the random access configuration information to the terminal device, so that the terminal device determines information such as a random access preamble index, a time-frequency resource, and a power configuration.

S302: The terminal device sends a Msg1 to the network device.

After the terminal device is powered on or needs to re-access a network, the terminal device scans the synchronization signal of the network device, performs downlink time and frequency synchronization, and receives configuration information (the random access configuration information) related to a random access resource in the system information.

The terminal device selects, based on the random access configuration information and the synchronized SSB, a random access resource associated with the SSB, where the resource includes a time and frequency resource, and a code domain resource (the random access preamble), and sends a random access signal, also referred to as the message 1 (Msg1), by using the random access resource. The Msg1, namely, the random access preamble (preamble or sequence), is carried by using a PRACH. The message 1 is usually used to initiate a connection request, a handover request, a synchronization request, or a scheduling request between a device and a network.

In an NR system, there is an association relationship between the SSB and the random access preamble sequence (which is also referred to as a preamble sequence for short, or may also be referred to as a physical random access channel (PRACH) sequence). In an implementation, a plurality of SSBs may be associated with different random access preamble sequences on a same random access occasion, and different SSBs are distinguished by using preamble sequence indexes. In another implementation, one SSB may be associated with a plurality of random access occasions. For a specific implementation, refer to an existing protocol. Details are not described herein.

The SSB is associated with the random access resource, so that after detecting the random access preamble, the network device can obtain a downlink beam for sending a message 2 (Msg2).

S303: The network device sends the Msg2 to the terminal device.

After receiving the Msg1 sent by the terminal device, the network device estimates a timing advance of the terminal device based on the preamble sent by the terminal device, and replies to the terminal device with the message 2 (Msg2). The Msg2 includes configuration information such as a time-frequency resource location and a modulation and coding scheme that are used by the terminal device to send a message 3 (Msg3) for conflict resolution.

The Msg2 is also referred to as a random access response (RAR) message, and is a response of the network device to the received Msg1. One Msg2 may be used to respond to a plurality of Msgs1. For a single random access preamble, there is a specific random access response message at a media access control MAC layer. However, the network device usually encapsulates responses to all random access preambles detected on one random access occasion together to form one Msg2. In other words, the network device may respond to a plurality of Msgs1 in a same Msg2, that is, a plurality of RARs are included. In other words, the RAR may be referred to as the message 2 at both a physical layer and the MAC layer, but is usually referred to as a response message corresponding to a specific random access preamble (for example, sent by the terminal) at the physical layer. At the MAC layer, the RAR is a combination of all random access preamble response messages detected by the base station on a specific random access occasion or a plurality of random access occasions, and is assembled in a form of a MAC data unit.

The RAR includes at least one of the following information: an index (random access preamble identifier, RAPID) of the Msg1, an uplink scheduling grant (uplink grant), a timing advance, a temporary cell radio network temporary identity (TC-RNTI), and the like.

After sending the random access preamble, the terminal device searches a corresponding Msg2 for a random access response message corresponding to the random access preamble sent by the terminal device, and ignores a response message for another random access preamble.

S304: The terminal device sends a Msg3 to the network device.

After receiving the Msg2, the terminal device sends the message 3 on a corresponding time-frequency resource based on a configuration in the Msg2. A transmission of the Msg3 is also referred to as a first uplink scheduling transmission, and is a transmission scheduled by using the UL grant in the message 2, or is a retransmission scheduled by using DCI scrambled by using the TC-RNTI. Content transmitted by the Msg3 is a high-layer message, for example, a connection establishment request message (which may be specifically identification information of a user who initiates a connection request). The message is used for contention resolution. If a plurality of different devices use a same Msg1 to perform random access, whether a conflict exists may be determined by using both the Msg3 and a Msg4. The transmission of the message 3 includes a retransmission and power control (that is, a UL grant for scheduling an initial transmission or a retransmission includes power control information).

S305: The network device sends the Msg4 to the terminal device.

After receiving the message 3, the network device replies to the user with the message 4 (Msg4), indicating that the terminal user successfully performs access.

The Msg4 is used for the contention resolution, and usually includes a CCCH SDU carried in the message 3. If the terminal device detects, in the message 4, the CCCH SDU sent by the terminal device, the terminal device considers that contention-based random access succeeds, and continues to perform a subsequent communication process. The message 4 is retransmitted, that is, a corresponding physical uplink control channel (PUCCH) is used to transmit feedback information (whether the message 4 is successfully detected), and power control is performed for sending the feedback information by the terminal device on the PUCCH.

The Msg1, the Msg3, and the Msg4 may be retransmitted (for example, retransmitted after a transmission fails).

In addition, to facilitate understanding of embodiments of this application, the following several descriptions are provided.

First, in this application, the term "indicate" may include a direct indication and an indirect indication. When a piece of indication information is described as indicating A, the indication information may directly indicate A or indirectly indicate A, but it does not necessarily indicate that the indication information carries A.

Information indicated by the indication information is referred to as to-be-indicated information. In a specific implementation process, there are a plurality of manners of indicating the to-be-indicated information, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on.

Furthermore, specific indication manners may alternatively be various existing indication manners, for example, but not limited to, the foregoing indication manners and various combinations thereof. For details of the various indication manners, refer to the conventional technology. The details are not described in this specification. It can be learned from the foregoing descriptions that, for example, when a plurality of pieces of information of a same type need to be indicated, different information may be indicated in different manners. In a specific implementation process, a required indication manner may be selected based on a specific requirement. The selected indication manner is not limited in embodiments of this application. In this way, the indication manner in embodiments of this application should be understood as covering various methods that can enable a to-be-indicated party to learn of the to-be-indicated information.

In addition, there may be another equivalent form for the to-be-indicated information. For example, a row vector may be represented as a column vector, and a matrix may be represented by using a transposed matrix of the matrix. Alternatively, a matrix may be represented in a form of a vector or an array, and the vector or array may be obtained by connecting row vectors or column vectors in the matrix, or the like. It should be understood that the technical solutions provided in embodiments of this application cover various forms. For example, some or all features in embodiments of this application should be understood as covering various representation forms of the features.

The to-be-indicated information may be sent as a whole, or may be divided into a plurality of pieces of sub-information for separate sending. In addition, sending periodicities and/or sending occasions of these pieces of sub-information may be the same or may be different. A specific sending method is not limited in this application. The sending periodicities and/or the sending occasions of these pieces of sub-information may be predefined, for example, predefined according to a protocol, or may be configured by a transmitting end device by sending configuration information to a receiving end device. The configuration information may include, for example, but not limited to, one or a combination of at least two of radio resource control signaling, media access control (media access control, MAC) layer signaling, and physical layer signaling. The radio resource control signaling includes, for example, radio resource control (radio resource control, RRC) signaling. The MAC layer signaling includes, for example, a MAC control element (CE). The physical layer signaling includes, for example, downlink control information (downlink control information, DCI).

Second, "first", "second", and various numerical numbers (for example, "#1" and "#2") in this application are merely used to distinguish between objects for ease of description, but are not intended to limit the scope of embodiments of this application, for example, are used to distinguish between different network devices.

Third, in this application, the term "preset" may include an indication of a network device by using signaling or predefinition, for example, definition in a protocol. The "predefinition" may be implemented by pre-storing corresponding code or a table in a device (for example, a terminal device and a network device); or implemented in another manner that may indicate related information. A specific implementation of the "predefinition" is not limited in this application.

Fourth, the term "saving" in embodiments of this application may be saving in one or more storages. The one or more storages may be separately disposed, or may be integrated into an encoder or a decoder, a processor, or a communication apparatus. Alternatively, a part of the one or more storages may be separately disposed, and a part of the one or more storages are integrated into the translator, the processor, or the communication apparatus. A type of the storage may be a storage medium in any form. This is not limited in this application.

Fifth, the "protocol" in embodiments of this application may refer to a standard protocol in the communication field, for example, may include an LTE protocol, an NR protocol, and a related protocol used for a future communication system. This is not limited in this application.

With reference to FIG. 1, the foregoing briefly describes a scenario to which a method for detecting a false base station provided in embodiments of this application can be applied, and describes basic concepts that may be used in embodiments of this application. The method for detecting a false base station provided in embodiments of this application is described below in detail with reference to the accompanying drawings.

In a system architecture shown in FIG. 1, a network device may notify, by using system information, a terminal device within coverage of the network device of various types of network-related information. Currently, no security protection is performed on the system information. Consequently, the terminal device cannot identify validity of the received system information. To enable the terminal device to identify the validity of the system information, it may be considered to introduce a key mechanism to perform integrity protection on the system information, for example, introduce an asymmetric key mechanism to perform integrity protection on the system information.

The method for detecting a false base station includes the following steps.

Step 1: A PKG generates a public key and notifies a terminal device of the public key through pre-configuration or by using another method.

Step 2: The PKG generates one private key for each network device, where the private key is used by the network device to digitally sign system information.

Step 3: To prevent a replay attack, a time counter parameter needs to be input when a digital signature is generated. The time counter parameter may be protected by the digital signature as a part of the system information.

For example, to reduce overheads, a plurality of pieces of system information may be digitally signed together.

Figure 4:
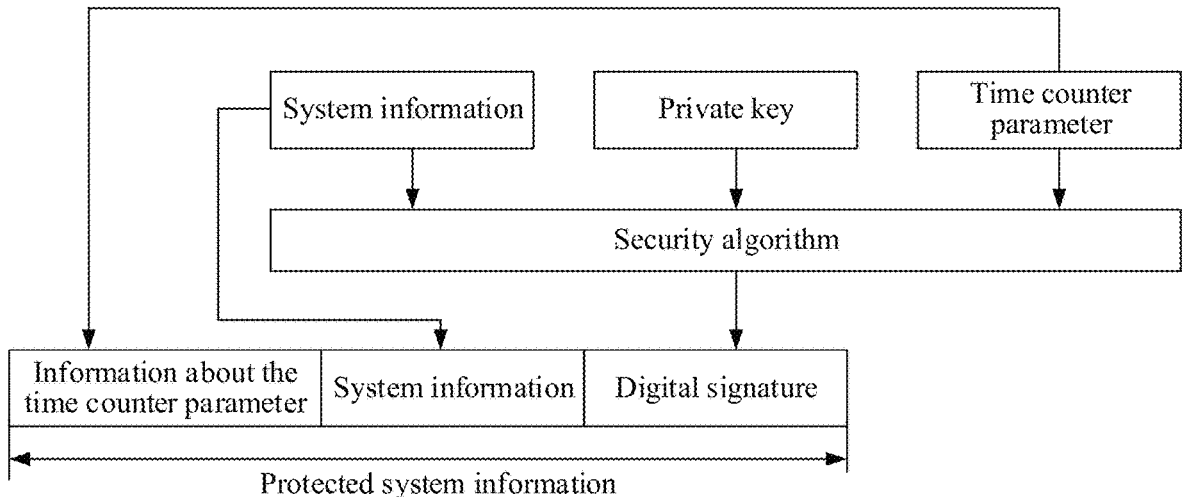
FIG. 4 is a diagram of a structure of protected system information.

For example, a structure of the protected system information generated by the network device may be shown in FIG. 4. FIG. 4 is a block diagram of a structure of system information according to an embodiment of this application.

It can be learned from FIG. 4 that the protected system information includes system information, a digital signature, and least signification bits of a time counter parameter (LSBs of Time Counter). The LSBs of Time Counter may be understood as information about a timestamp and indicates the timestamp.

The system information is to-be-sent system information. The digital signature is generated by using a security algorithm based on the to-be-sent system information, a private key of the network device, and the time counter parameter. The LSBs of Time Counter identify the time counter parameter.

It should be understood that, how to generate the digital signature is not limited in this embodiment of this application. For details, refer to descriptions in a current technology related to the digital signature.

Step 4: After receiving the system information, the terminal device checks a signature of the system information by using the public key, to determine validity of the received message.

This application further provides a method for detecting a false base station, to verify whether a terminal device is under a replay attack from the false base station, so as to improve communication security.

Figure 5:
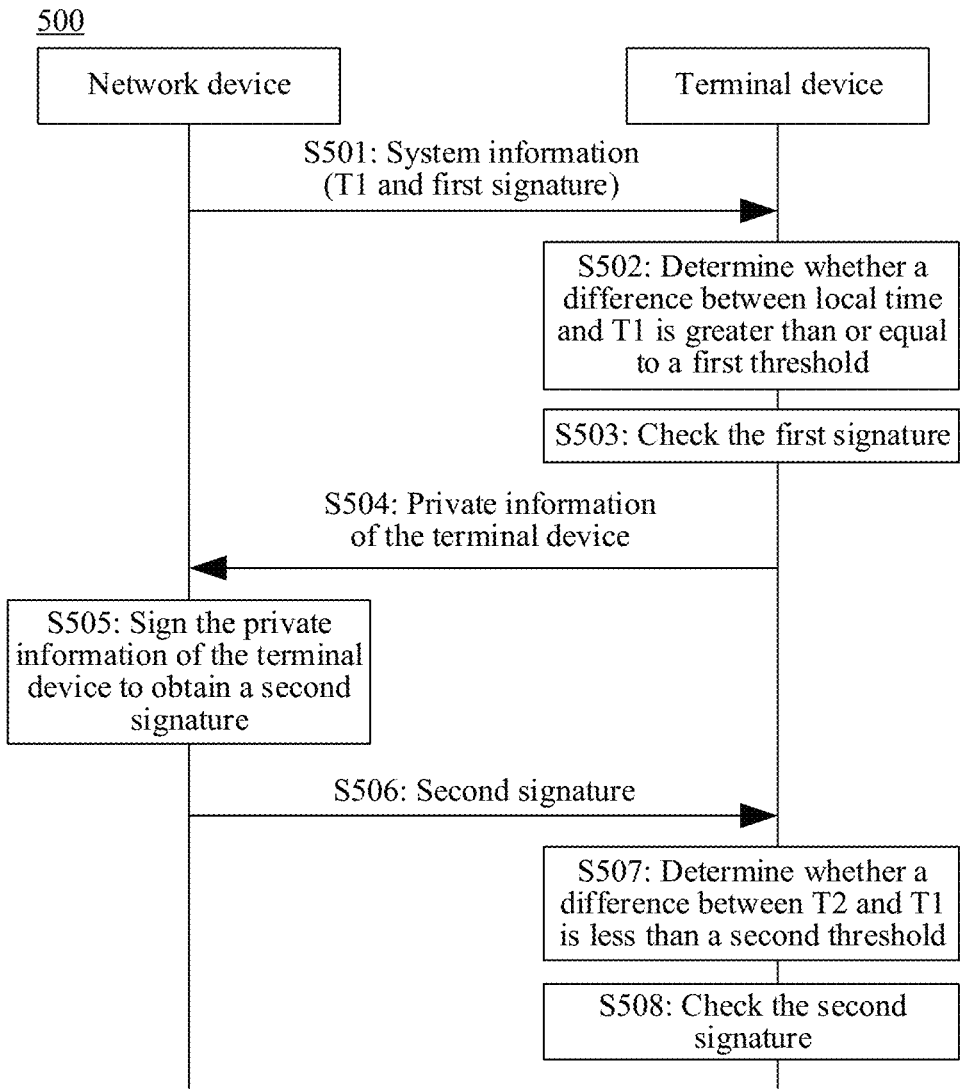
FIG. 5 is a schematic flowchart of a method for detecting a false base station according to an embodiment of this application.

FIG. 5 is a schematic flowchart of a method 500 for detecting a false base station according to an embodiment of this application. The following describes the method 500 by using an example with reference to steps.

S501: A network device sends system information to a terminal device. Correspondingly, the terminal device receives the system information from the network device.

For example, the network device sends the system information to the terminal device in a broadcast manner. The system information includes a first timestamp (denoted as T1) and a first signature. The first timestamp T1 may be time at which the network device generates the first signature. The first signature may be obtained by the network device by signing the to-be-broadcast system information based on parameters such as a private key and T1. For example, the network device uses the private key, T1 (which may further include another characteristic parameter, where this is not limited), and the system information as an input of a security algorithm, and the first signature is generated through processing performed by using the security algorithm. The first signature is used to protect authenticity of the system information, in other words, the first signature is used to verify whether the system information is forged or tampered with.

S502: The terminal device determines whether a difference between local time and T1 is greater than or equal to a first threshold.

S503: The terminal device checks the first signature.

For example, after receiving system information #1 from the network device, the terminal device obtains T1 and the first signature from the system information. The terminal device determines whether the difference between the local time and T1 is greater than or equal to the first threshold, and checks the first signature based on a locally pre-configured global public key. It should be understood that the local time herein may be time displayed locally when the terminal device receives the first signature.

It should be understood that S503 may be performed after S502, or may be performed before S502. If S503 is performed before S502, in an implementation, the terminal device may determine, after the check on the first signature succeeds, whether the difference between the local time and T1 is greater than or equal to the first threshold. In other words, when the check on the first signature fails, the terminal device may not perform S502.

S504: The terminal device sends private information of the terminal device to the network device. Correspondingly, the network device receives the private information from the terminal device.

For example, when the terminal device determines that the difference between the local time and T1 is greater than or equal to the first threshold and the check on the first signature succeeds, the terminal device sends the private information of the terminal device to the network device by using an uplink message.

The terminal device may implicitly indicate, by including the private information of the terminal device in the uplink message, that check on a signature (that is, the first signature) of the system information received by the terminal device succeeds, but a difference between the local time and a timestamp (that is, T1) carried in the system information is greater than or equal to the specified threshold. Alternatively, the terminal device may include a cause value (that is, a flag bit) in the uplink message, and explicitly indicate, by using the cause value, that check on a signature (that is, the first signature) of the system information received by the terminal device succeeds, but a difference between the local time and a timestamp (that is, T1) carried in the system information is greater than or equal to a specified threshold (that is, the first threshold). This is not limited in this application.

The private information of the terminal device may be any information that is private to the terminal device and that can identify an identity of the terminal device, in other words, the private information of the terminal device that cannot be obtained by a false base station in advance. It should be understood that the private information of the terminal device may be existing information of the terminal device, or may be information newly generated by the terminal device (for example, a random number generated by the terminal device). This is not limited in this application.

S505: The network device signs the private information of the terminal device.

For example, after receiving the uplink message sent by the terminal device, the network device parses out the private information (optionally, further including the cause value) of the terminal device from the uplink message. The network device determines, based on the uplink message, that the check on the signature (that is, the first signature) of the system information received by the terminal device succeeds, but the difference between the local time and the timestamp (that is, T1) carried in the system information is greater than or equal to the specified threshold (that is, the first threshold). Based on this, the network device signs the private information of the terminal device by using the private key, to obtain a second signature. It should be understood that the private key herein is a private key pre-generated by a key generation center for the network device. For a specific process, refer to an existing protocol. Details are not described herein.

It should be understood that, in addition to the private information of the terminal device, the network device may further use another parameter (for example, current system time of the network device) as an input parameter to generate the second signature. This is not limited in this application.

S506: The network device sends the second signature to the terminal device. Correspondingly, the terminal device receives the second signature from the network device.

For example, after generating the second signature, the network device may send the second signature to the terminal device by using a downlink message.

S507: The terminal device determines whether a difference between T2 and T1 is less than a second threshold.

For example, after receiving the second signature from the network device, the terminal device determines whether the difference between T2 and T1 is less than the second threshold, where T2 is time at which the terminal device receives the second signature from the network device. It should be understood that the second threshold may be the same as the first threshold, or may be different from the first threshold. This is not limited in this application.

Optionally, in another implementation, if the network device further sends T3 (where T3 indicates time at which the network device generates the second signature, and T3 is protected by using the second signature), the terminal device may further determine whether a difference between T3 and the local time is less than a third threshold. The third threshold may be the same as the first threshold, or may be different from the first threshold. This is not limited in this application.

S508: The terminal device checks the second signature.

For example, if the difference between T2 and T1 is greater than or equal to the second threshold, the terminal device may determine that the network device (or a system information sender) is the false base station. If the difference between T2 and T1 is less than the second threshold, the terminal device may determine that the time at which the terminal device receives the second signature is within a specified time range. Further, the terminal device checks the second signature based on the locally pre-configured global public key and the private information sent by the terminal device to the network device. If the check on the second signature succeeds, the terminal device continues to perform subsequent procedures. If the check on the second signature fails, the terminal device considers that the network device is the false base station. When the terminal device determines that the network device is the false base station, the terminal device ignores or discards the system information sent by the network device, or the terminal device stops accessing the network device.

It should be understood that S508 may be performed after S507, or may be performed before S507. When S508 is performed before S507, in an implementation, the terminal device may determine, after the check on the second signature succeeds, whether the difference between T2 and T1 is greater than or equal to the second threshold. In other words, when the check on the second signature fails, the terminal device may not perform S508.

Based on the foregoing solution, whether the terminal device is attacked by the false base station can be verified. Specifically, both the network device and the terminal device preset a signature of a public key. When the terminal device does not establish a secure link with the network device in an initial network access phase, and when the difference between the local time and the timestamp (T1) carried in the system information is greater than or equal to the first threshold and the check on the signature (the first signature) in the system information succeeds, the terminal device reports the private information of the terminal device to the network device, so that the network device can provide the terminal device with the second signature obtained by signing the private information of the terminal device. Further, the terminal device checks the time (T2) at which the second signature is received and the second signature, and may determine, based on a check result, whether the network device is the false base station, or whether the terminal device is attacked by the false base station. For example, when the difference between T2 and T1 is less than the second threshold and the check on the second signature succeeds, the terminal device determines that the network device is an authorized base station; or when the difference between T2 and T1 is greater than or equal to the second threshold and/or the check on the second signature fails, the terminal device determines that the network device is the false base station.

FIG. 6 is a schematic flowchart of another method 600 for detecting a false base station according to an embodiment of this application. The following describes the method 600 by using an example with reference to steps.

S601: A network device sends system information to a terminal device. Correspondingly, the terminal device receives the system information from the network device.

For example, the network device sends the system information to the terminal device in a broadcast manner. The system information includes a SIB 1, and the SIB 1 includes a correspondence between a UE ID range and a prach sequence selection range. In other words, the SIB 1 may be used to determine prach sequence selection ranges corresponding to different UE ID ranges.

Optionally, before S601, the network device generates (or determines) an association relationship between a UE ID range and a prach sequence selection range. A specific manner is not limited in this application.

The system information further includes a timestamp T1 and a first signature. For specific descriptions, refer to S501 in the method 500. Details are not described herein again.

S602: The terminal device determines whether a difference between local time and T1 is greater than or equal to a first threshold.

S603: The terminal device checks the first signature.

It should be understood that S602 and S603 are similar to S502 and S503 in the method 500. Details are not described herein again.

S604: The terminal device selects a prach sequence based on an identifier of the terminal device.

For example, when the terminal device determines that the difference between the local time and T1 is greater than or equal to the first threshold and the check on the first signature succeeds, the terminal device determines a prach sequence selection range based on the SIB 1 and the identifier of the terminal device and then selects the prach sequence from the prach sequence selection range.

For example, the terminal device obtains the SIB 1 from the network device and determines a correspondence between different UE ID ranges and prach sequence selection ranges based on the SIB 1. Then, the terminal device determines a UE ID range to which an identifier #1 of the terminal device (that is, a UE ID of the terminal device) belongs and a prach sequence selection range corresponding to the UE ID range. Finally, the terminal device selects an appropriate prach sequence from the prach sequence selection range.

S605: The terminal device sends a Msg1 to the network device. Correspondingly, the network device receives the Msg1 from the terminal device.

For example, after selecting the prach sequence based on the identifier #1 of the terminal device, the terminal device sends the Msg1 to the network device based on the prach sequence. For a specific process, refer to step S302 in the method 300. Details are not described herein again.

S606: The network device determines a range of the identifier of the terminal device based on seq id of the prach sequence.

For example, after receiving the Msg1 from the terminal device, the network device may determine seq id of the prach sequence, and the network device determines, based on seq id of the prach sequence and the correspondence between different UE ID ranges and the prach sequence selection ranges, the UE ID range to which the identifier of the terminal device belongs.

S607: The terminal device sends a Msg3 to the network device.

For example, after receiving the Msg1 from the terminal device, the network device sends a Msg2 to the terminal device, and the terminal device sends the Msg3 to the network device based on the Msg2. For a specific process, refer to S303 and S304 in the method 300. Details are not described herein again.

It should be noted that, in S607, the terminal device includes a cause value (that is, a flag bit) in the Msg3. The cause value indicates that check on a signature (that is, the first signature) of the system information received by the terminal device succeeds, but the difference between the local time and the timestamp (that is, T1) carried in the system information is greater than or equal to a specified threshold (that is, the first threshold).

It should be understood that the Msg3 may be an RRC Msg3. In this case, the cause value may be a reserved flag bit in the Msg3. The Msg3 may alternatively be a MAC CE Msg3. In this case, the cause value may be a flag bit newly added to the Msg3.

S608: The network device signs an identifier #2 of the terminal device and the cause value to obtain a second signature.

For example, after receiving the Msg3 from the terminal device, the network device determines, based on the cause value carried in the Msg3, that the check on the signature (that is, the first signature) of the system information received by the terminal device succeeds, but the difference between the local time and the timestamp (that is, T1) carried in the system information is greater than or equal to the specified threshold (that is, the first threshold). Based on this, the network device signs the identifier #2 of the terminal device, the cause value, and/or current system time by using a private key, to obtain the second signature.

It should be understood that an input parameter used for signing by the network device may further include another parameter. This is not limited in this application.

It should be further understood that the identifier of the terminal device herein may be determined by the network device based on the identifier range of the terminal device determined in S606 and a preset algorithm. The identifier #2 and the identifier #1 may be the same or may be different.

S609: The network device sends a Msg4 to the terminal device. Correspondingly, the terminal device receives the Msg4 from the network device.

For example, after generating the second signature, the network device sends the Msg4 to the terminal device, where the Msg4 includes the second signature.

S610: The terminal device determines whether a difference between T2 and T1 is less than a second threshold.

It should be understood that S610 is similar to S507 in the method 500. For brevity, details are not described herein again.

S611: The terminal device checks the second signature.

If the difference between T2 and T1 is greater than or equal to the second threshold, the terminal device may determine that the network device (or a system information sender) is a false base station. If the difference between T2 and T1 is less than the second threshold, the terminal device may determine that time at which the terminal device receives the second signature is within a specified time range. Further, the terminal device checks the second signature based on information such as a locally pre-configured global public key and the identifier #2 of the terminal device.

It should be understood that the identifier #2 of the terminal device may be determined by the terminal device based on the range to which the identifier #1 of the terminal device belongs and the preset algorithm. The algorithm is the same as an algorithm preset on a network device side. If the check on the second signature succeeds, the terminal device continues to perform subsequent procedures. If the check on the second signature fails, the terminal device considers that the network device is the false base station. When the terminal device determines that the network device is the false base station, the terminal device ignores or discards the system information sent by the network device, or the terminal device stops accessing the network device.

Based on the foregoing solution, the terminal device may detect whether the system information sender is the false base station, to ensure communication security.

Figure 7:
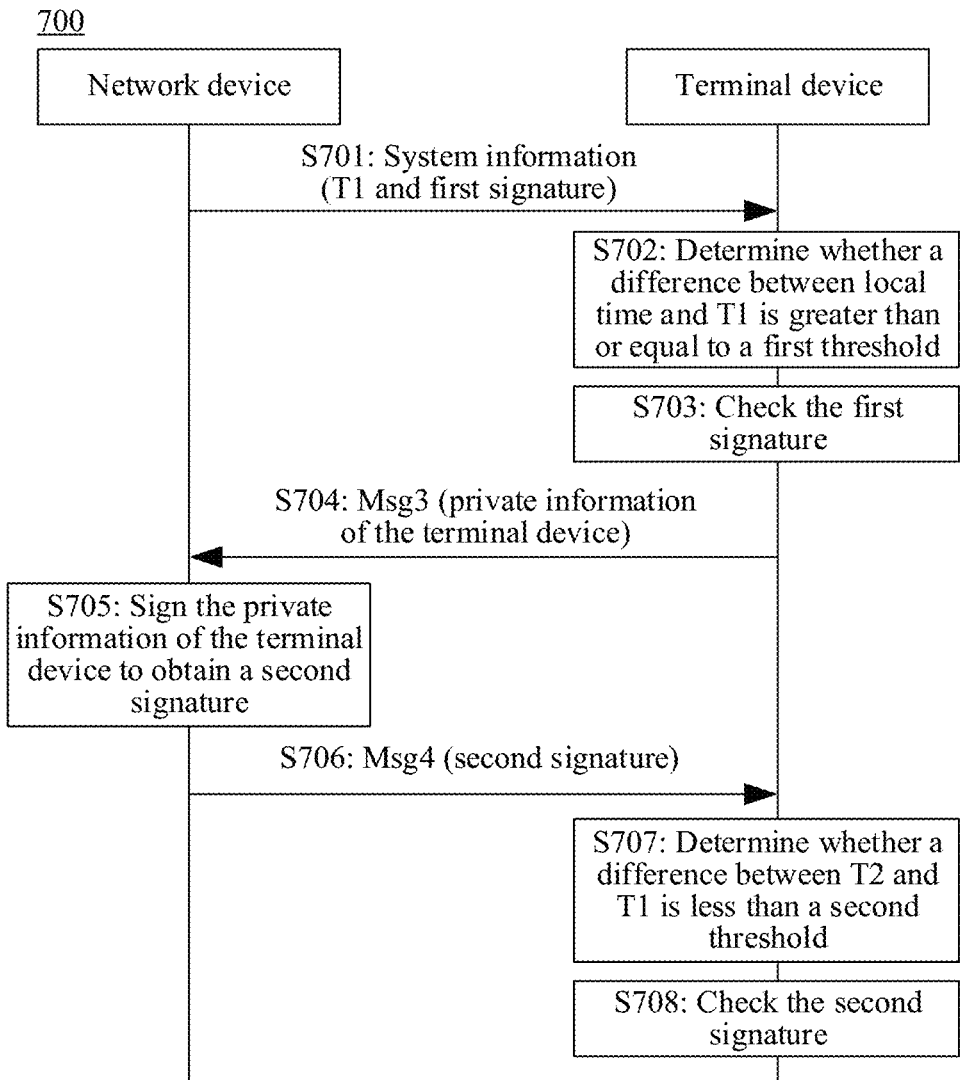
FIG. 7 is a schematic flowchart of still another method for detecting a false base station according to an embodiment of this application.

FIG. 7 is a schematic flowchart of another method 700 for detecting a false base station according to an embodiment of this application. The following describes the method 700 by using an example with reference to steps.

It should be understood that S701 to S703 are similar to S501 to S503 in the method 500. For brevity, details are not described herein again.

Further, if a terminal device determines that a difference between local time and T1 is greater than or equal to a first threshold and check on a first signature succeeds, the terminal device may send private information of the terminal device to a network device in a random access procedure. The following provides an example for description with reference to S704.

S704: The terminal device sends a Msg3 to the network device. Correspondingly, the network device receives a Msg3 from the terminal device.

For example, if the terminal device determines that the difference between the local time and T1 is greater than or equal to the first threshold and the check on the first signature succeeds, the terminal device includes the private information of the terminal device in the Msg3.

In a possible implementation, the private information of the terminal device may be carried in an information bit newly added to the Msg3.

Optionally, the terminal device may further include a cause value in the Msg3. The cause value indicates that check on a signature (that is, the first signature) of the system information received by the terminal device succeeds, but the difference between the local time and a timestamp (that is, T1) carried in the system information is greater than or equal to a specified threshold (that is, the first threshold).

It should be understood that an exchange process of a Msg1 and a Msg2 in a random access process is omitted in the foregoing procedure. For details, refer to S302 and S303 in the method 300. Details are not described herein again.

S705: The network device signs the private information of the terminal device to obtain a second signature.

For example, after the network device receives the Msg3 from the terminal device, the network device obtains the private information (optionally, further including the cause value) of the terminal device from the Msg3. The network device may determine, based on the information carried in the Msg3, that the check on the signature (that is, the first signature) of the system information received by the terminal device succeeds, but the difference between the local time and the timestamp (that is, T1) carried in the system information is greater than or equal to the specified threshold (that is, the first threshold). Based on this, the network device signs the private information of the terminal device by using a private key, to obtain the second signature.

It should be understood that, in addition to the private information of the terminal device, the network device may further use another parameter as an input parameter to generate the second signature. For example, the network device signs one or more of the private information of the terminal device, the cause value, current system time, an identifier of the terminal device, and a C-RNTI by using the private key, to obtain the second signature.

S706: The network device sends a Msg4 to the terminal device. Correspondingly, the terminal device receives the Msg4 from the network device.

For example, after generating the second signature, the network device sends the Msg4 to the terminal device, and includes the second signature in the Msg4.

S707: The terminal device determines whether a difference between T2 and T1 is less than a second threshold.

S708: The terminal device checks the second signature.

It should be understood that S707 and S708 are similar to S507 and S508 in the method 500. For brevity, details are not described herein again.

Based on the foregoing solution, the terminal device may detect whether a system information sender is a false base station, to ensure communication security.

The foregoing describes in detail the methods provided in embodiments of this application with reference to FIG. 5 to FIG. 7. The following describes in detail apparatuses provided in embodiments of this application with reference to FIG. 8 to FIG. 11. It should be understood that descriptions of apparatus embodiments correspond to the descriptions of the method embodiments. Therefore, for content that is not described in detail, refer to the method embodiments above. For brevity, details are not described herein again.

Figure 8:
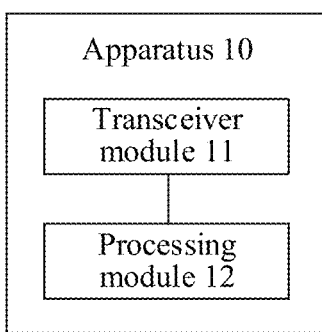
FIG. 8 is a block diagram of a communication apparatus according to an embodiment of this application.

FIG. 8 is a block diagram of a communication apparatus 10 according to an embodiment of this application. The apparatus 10 includes a transceiver module 11 and a processing module 12. The transceiver module 11 may implement a corresponding communication function. The processing module 12 is configured to perform data processing. In other words, the transceiver module 11 is configured to perform operations related to receiving and sending. The processing module 12 is configured to perform operations other than receiving and sending. The transceiver module 11 may also be referred to as a communication interface or a communication unit.

In an implementation, the apparatus 10 may correspond to the network device in the foregoing method embodiments.

For example, the apparatus 10 may correspond to the network device in the method 500, the method 600, or the method 700 in embodiments of this application. The apparatus 10 may include modules configured to perform the methods performed by the network devices in FIG. 5 to FIG. 7. In addition, the modules in the apparatus 10 and the foregoing other operations and/or functions are respectively used to implement corresponding procedures of the methods shown in FIG. 5 to FIG. 7.

The transceiver module 11 in the apparatus 10 performs receiving and sending operations performed by the network device in the foregoing method embodiments, and the processing module 12 performs operations other than the receiving and sending operations.

In another possible design, the apparatus 10 may correspond to the terminal device in the foregoing method embodiments.

For example, the apparatus 10 may correspond to the terminal device in the method 500, the method 600, or the method 700 in embodiments of this application. The apparatus 10 may include modules configured to perform the methods performed by the terminal devices in FIG. 5 to FIG. 7. In addition, the modules in the apparatus 10 and the foregoing other operations and/or functions are respectively used to implement corresponding procedures of the methods shown in FIG. 5 to FIG. 7.

The transceiver module 11 in the apparatus 10 performs receiving and sending operations performed by the terminal device in the foregoing method embodiments, and the processing module 12 performs operations other than the receiving and sending operations.

Figure 9:
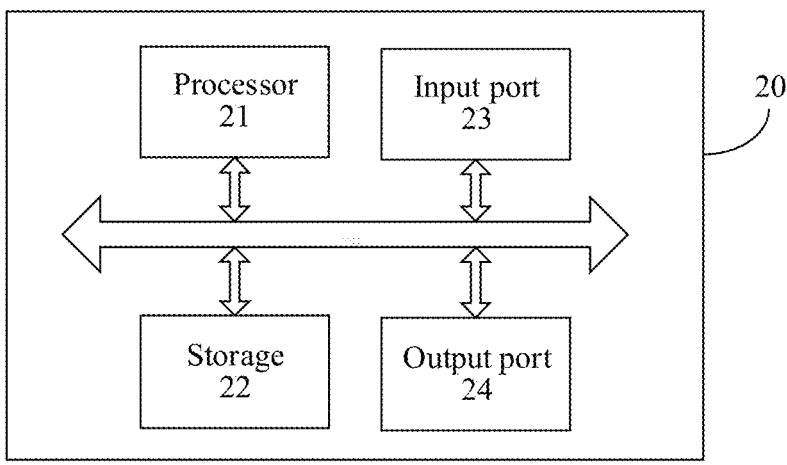
FIG. 9 is a block diagram of a communication apparatus according to another embodiment of this application.

According to the foregoing methods, FIG. 9 is a diagram of a communication apparatus 20 according to an embodiment of this application. In a possible design, the apparatus 20 may correspond to the network device in the foregoing method embodiments. In another possible design, the apparatus 10 may correspond to the terminal device in the foregoing method embodiments.

The apparatus 20 may include a processor 21 (that is, an example of a processing module) and a memory 22. The memory 22 is configured to store instructions. The processor 21 is configured to execute the instructions stored in the memory 22, so that the apparatus 20 implements the steps performed by the terminal device or the network device in the methods corresponding to FIG. 5 to FIG. 7. The network device may be the network device in the methods 500 to 700.

Further, the apparatus 20 may further include an input port 23 (that is, an example of a transceiver module) and an output port 24 (that is, another example of the transceiver module). Further, the processor 21, the memory 22, the input port 23, and the output port 24 may communicate with each other through an internal connection path, to transmit a control signal and/or a data signal. The memory 22 is configured to store a computer program. The processor 21 may be configured to invoke the computer program from the memory 22 and run the computer program, to control the input port 23 to receive a signal, and control the output port 24 to send a signal, to complete the steps performed by the terminal device or the network device in the foregoing methods. The memory 22 may be integrated into the processor 21, or may be disposed separately from the processor 21.

Optionally, if the communication apparatus 20 is a communication device, the input port 23 is a receiver, and the output port 24 is a transmitter. The receiver and the transmitter may be a same physical entity or different physical entities. When the receiver and the transmitter are a same physical entity, the receiver and the transmitter may be collectively referred to as a transceiver.

Optionally, if the communication apparatus 20 is a chip or a circuit, the input port 23 is an input interface, and the output port 24 is an output interface.

In an implementation, it may be considered that functions of the input port 23 and the output port 24 are implemented through a transceiver circuit or a dedicated transceiver chip. It may be considered that the processor 21 is implemented through a dedicated processing chip, a processing circuit, a processor, or a general-purpose chip.

In another implementation, it may be considered that the communication device provided in this embodiment of this application is implemented by using a general-purpose computer. To be specific, program code for implementing functions of the processor 21, the input port 23, and the output port 24 is stored in the memory 22, and the general-purpose processor implements the functions of the processor 21, the input port 23, and the output port 24 by executing the code in the memory 22.

For concepts, explanations, detailed descriptions, and other steps of the apparatus 20 that are related to the technical solutions provided in embodiments of this application, refer to the descriptions of the content in the foregoing methods or other embodiments. Details are not described herein again.

Figure 10:
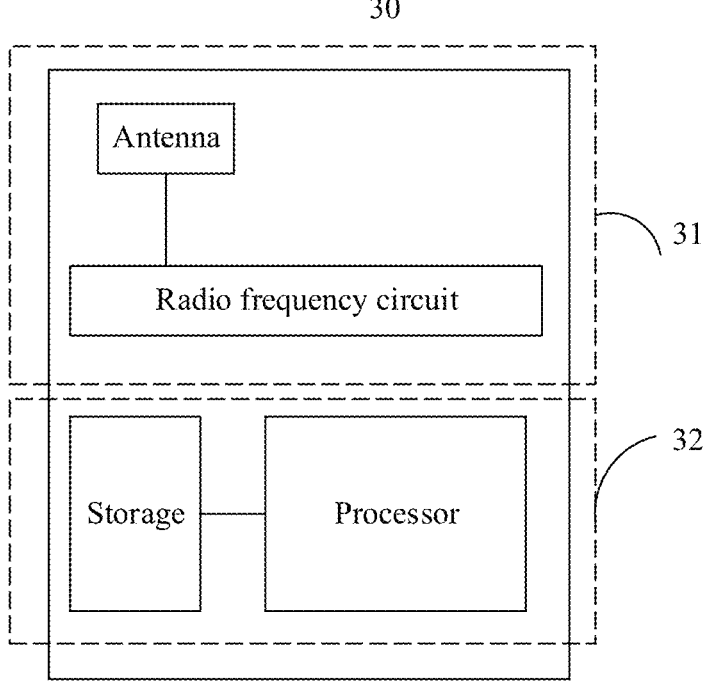
FIG. 10 is a block diagram of a communication apparatus according to still another embodiment of this application.

FIG. 10 is a diagram of a structure of a simplified network device 30. The network device includes a part 31 and a part 32. The part 31 is mainly configured to transmit and receive a radio frequency signal and convert a radio frequency signal and a baseband signal. The part 32 is mainly configured to perform baseband processing, control the network device, and the like. The part 31 may be usually referred to as a transceiver module, a transceiver, a transceiver circuit, a transceiver machine, or the like. The part 32 is usually a control center of the network device, and may be usually referred to as a processing module, and is configured to control the network device to perform a processing operation on a network device side in the foregoing method embodiments.

The transceiver module in the part 31 may also be referred to as a transceiver, a transceiver machine, or the like, and includes an antenna and a radio frequency circuit. The radio frequency circuit is mainly configured to perform radio frequency processing. For example, a component configured to implement a receiving function in the part 31 may be considered as a receiving module, and a component configured to implement a sending function may be considered as a sending module. In other words, the part 31 includes the receiving module and the sending module. The receiving module may also be referred to as a receiver, a receiver machine, a receiver circuit, or the like, and the sending module may be referred to as a transmitter, a transmitter machine, a transmitter circuit, or the like.

The part 32 may include one or more boards, and each board may include one or more processors and one or more memories. The processor is configured to read and execute a program in the memory to implement a baseband processing function and control the network device. If there are a plurality of boards, the boards may be interconnected with each other, to enhance a processing capability. In an optional implementation, a plurality of boards may share one or more processors, or a plurality of boards share one or more memories, or a plurality of boards share one or more processors at the same time.

For example, in an implementation, the network device shown in FIG. 10 may be any network device shown in the methods shown in FIG. 5 to FIG. 7, for example, a leading evolved node 101 and a secondary next generation node 103.

The transceiver module in the part 31 is configured to perform steps related to receiving and sending of any network device in the methods shown in FIG. 5 to FIG. 7. The part 32 is configured to perform steps related to processing of any network device in the methods shown in FIG. 5 to FIG. 7.

It should be understood that FIG. 10 is merely an example rather than a limitation, and the foregoing network device including the transceiver module and the processing module may not depend on the structure shown in FIG. 10.

When the apparatus 40 is a chip, the chip includes a transceiver module and a processing module. The transceiver module may be an input/output circuit or a communication interface. The processing module is a processor, a microprocessor, or an integrated circuit integrated on the chip.

Figure 11:
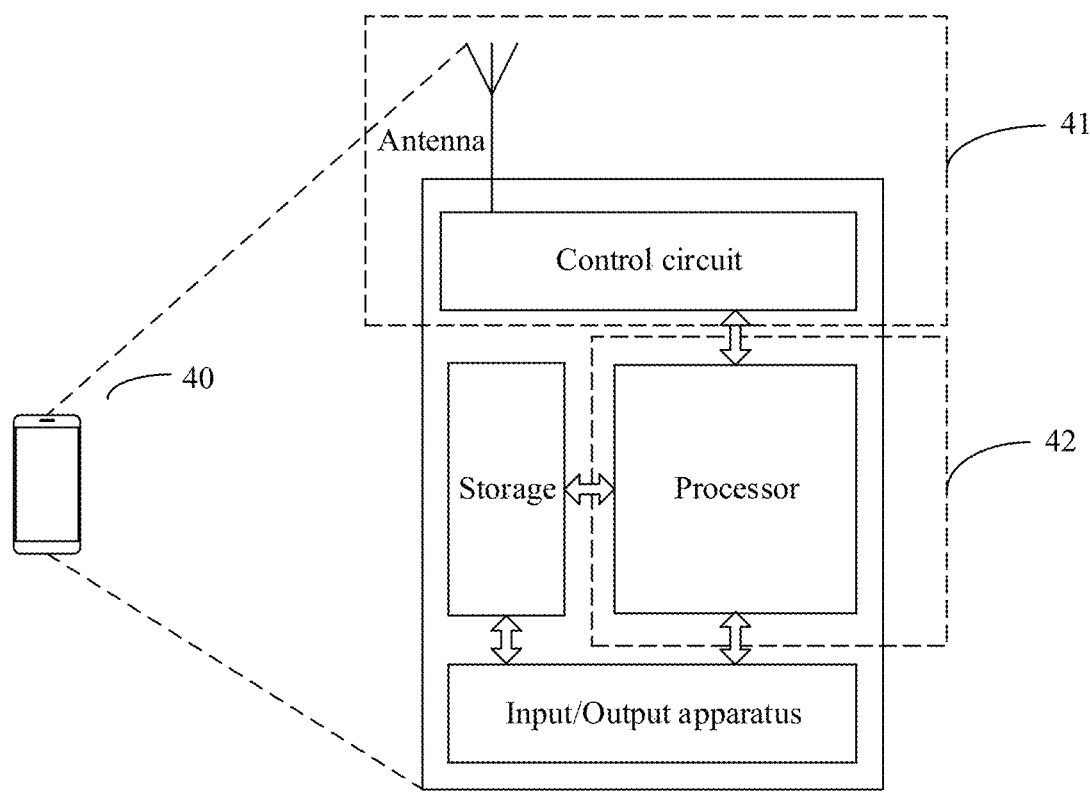
FIG. 11 is a block diagram of a communication apparatus according to still another embodiment of this application.

FIG. 11 is a diagram of a structure of a terminal device 40 according to this application. For ease of description, FIG. 8 shows only main components of the communication apparatus. As shown in FIG. 11, the terminal device 40 includes a processor, a memory, a control circuit, an antenna, and an input/output apparatus.

The processor is mainly configured to process a communication protocol and communication data, control an entire terminal device, execute a software program, and process data of the software program, for example, is configured to support the terminal device to perform the actions described in the foregoing embodiments of the indication method for transmitting a precoding matrix. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to receive data input by a user and output data to the user.

After the communication apparatus is powered on, the processor may read a software program in a storage unit, explain and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 11 shows only one memory and one processor. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 11 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

As shown in FIG. 11, the terminal device 40 includes a transceiver unit 41 and a processing unit 42. The transceiver unit may also be referred to as a transceiver, a transceiver machine, a transceiver apparatus, or the like. Optionally, a component configured to implement a receiving function in the transceiver unit 41 may be considered as a receiving unit, and a component configured to implement a sending function in the transceiver unit 41 may be considered as a sending unit. In other words, the transceiver unit 41 includes the receiving unit and the sending unit. For example, the receiving unit may also be referred to as a receiver, a receive machine, or a receiving circuit, and the sending unit may also be referred to as a transmitter, a transmit machine, or a transmitting circuit.

The terminal device shown in FIG. 11 may perform the actions performed by the terminal device in the methods shown in FIG. 5 to FIG. 7. To avoid repetition, detailed descriptions thereof are omitted herein.

An embodiment of this application further provides a computer-readable storage medium. The computer-readable storage medium stores computer instructions used for implementing the method performed by the network device in the foregoing method embodiments.

For example, when the computer program is executed by a computer, the computer can implement the method performed by the network device in the foregoing method embodiments.

An embodiment of this application further provides a computer program product including instructions. When the instructions are executed by a computer, the computer implements the method performed by a first device or the method performed by a second device in the foregoing method embodiments.

An embodiment of this application further provides a communication system. The communication system includes the network device in the foregoing embodiments.

For explanations and beneficial effects of related content in any one of the foregoing provided apparatuses, refer to the corresponding method embodiments provided above. Details are not described herein again.

In embodiments of this application, the network device may include a hardware layer, an operating system layer running above the hardware layer, and an application layer running above the operating system layer. The hardware layer may include hardware such as a central processing unit (CPU), a memory management unit (MMU), and memory (also referred to as main memory). An operating system at the operating system layer may be any one or more computer operating systems that implement service processing by using a process, for example, a Linux operating system, a Unix operating system, an Android operating system, an iOS operating system, or a windows operating system. The application layer may include applications such as a browser, an address book, word processing software, and instant messaging software.

A specific structure of an execution body of the method provided in embodiments of this application is not particularly limited in embodiments of this application, provided that communication can be performed according to the method provided in embodiments of this application by running a program that records code of the method provided in embodiments of this application. For example, the method provided in embodiments of this application may be performed by a network device, or a functional module in the network device that can invoke and execute a program.

Various aspects or features of this application may be implemented as methods, apparatuses, or products using standard programming and/or engineering techniques. As used herein, the term "artificial article" may encompass a computer program accessible from any computer-readable device, carrier, or medium. For example, a computer-readable medium may include, but is not limited to: a magnetic storage device (for example, a hard disk drive, a floppy disk, or a magnetic tape), an optical disc (for example, a compact disc (CD), a digital versatile disc (DVD), or the like), a smart card, and a flash memory component (for example, an erasable programmable read-only memory (EPROM), a card, a stick, or a key drive).

Various storage media described in this specification may represent one or more devices and/or other machine-readable media that are configured to store information. The term "machine-readable media" may include but is not limited to a radio channel, and various other media that can store, include, and/or carry instructions and/or data.

It should be understood that, the processor mentioned in embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the storage mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM can be used as an external cache. By way of example, and not limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the storage (a storage module) may be integrated into the processor.

It should further be noted that the storage described herein is intended to include, but is not limited to, these and any other suitable type of storage.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the apparatuses and units described above, reference may be made to a corresponding process in the foregoing method embodiments, and details are not described herein.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to implement the solutions provided in this application.

In addition, functional units in embodiments of this application may be integrated into one unit, each of the units may exist alone physically, or two or more units may be integrated into one unit.

All or a part of the foregoing embodiments may be implemented by using software, hardware, firmware, or any combination thereof. When software is used to implement embodiments, all or a part of embodiments may be implemented in a form of a computer program product. The computer program product includes one or more computer program instructions. When the computer program instructions are loaded and executed on the computer, the procedure or functions according to embodiments of this application are all or partially generated. The computer may be a general-purpose computer, a dedicated computer, a computer network, or other programmable apparatuses. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state disk (SSD)), or the like. For example, the foregoing usable media may include but are not limited to: any medium that can store program code, for example, a USB flash drive, a removable hard disk drive, a read-only memory (read-only memory, ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and the specification.

What is claimed is:

1. A method, comprising:

sending, by a network device, system information to a terminal device, wherein the system information comprises a first signature of the system information, a first timestamp, and a correspondence between a terminal identifier range and a selection range of a physical random access channel sequence, and the first timestamp identifies a time at which the network device generates the first signature;

receiving, by the network device, a message 1 from the terminal device;

determining, by the network device, a terminal identifier range corresponding to the terminal device based on an identifier of a physical random access channel sequence corresponding to the message 1 and the correspondence between the terminal identifier range and the selection range of the physical random access channel sequence;

signing, by the network device, an identifier of the terminal device and a current system time using a private key corresponding to the network device, to obtain a second signature, wherein the identifier of the terminal device is determined based on the terminal identifier range corresponding to the terminal device; and sending, by the network device, the second signature to the terminal device.

2. The method according to claim 1, wherein the method further comprises:

receiving, by the network device, a message 3 from the terminal device, wherein the message 3 comprises indication information, and the indication information indicates that a check performed by the terminal device on the first signature succeeds, and that a difference between a local time of the terminal device and the first timestamp is greater than or equal to a first threshold.

3. The method according to claim 2, wherein the signing, by the network device, an identifier of the terminal device and a current system time using a private key corresponding to the network device, to obtain a second signature comprises:

signing, by the network device, the identifier of the terminal device, the current system time, and the indication information using the private key corresponding to the network device, to obtain the second signature.

4. The method according to claim 1, wherein the sending, by the network device, the second signature to the terminal device comprises:

sending, by the network device, a message 4 to the terminal device, wherein the message 4 comprises the second signature.

5. A method, comprising:

receiving, by a communication apparatus, system information from a network device, wherein the system information comprises a first signature of the system information, a first timestamp, and a correspondence between a terminal identifier range and a selection range of a physical random access channel sequence, and the first timestamp identifies a time at which the network device generates the first signature;

based on the communication apparatus determining that a difference between a local time of the communication apparatus and the first timestamp is greater than or equal to a first threshold and that a check on the first signature succeeds, selecting, by the communication apparatus, a physical random access channel sequence based on an identifier of the communication apparatus and the correspondence between the terminal identifier range and the selection range of the physical random access channel sequence;

sending, by the communication apparatus, a message 1 to the network device based on the selected physical random access channel sequence;

receiving, by the communication apparatus, a second signature from the network device;

verifying, by the communication apparatus, whether a difference between a second timestamp and the first timestamp is less than a second threshold, wherein the second timestamp identifies a time at which the communication apparatus receives the second signature; and checking, by the communication apparatus, the second signature using the identifier of the communication apparatus and a current system time, wherein the identifier of the communication apparatus is determined based on a terminal identifier range corresponding to the identifier of the communication apparatus.

6. The method according to claim 5, wherein the method further comprises:

sending, by the communication apparatus, a message 3 to the network device, wherein the message 3 comprises indication information, and the indication information indicates that a check performed by the communication apparatus on the first signature succeeds, and that the difference between the local time of the communication apparatus and the first timestamp is greater than or equal to the first threshold.

7. The method according to claim 6, wherein the checking, by the communication apparatus, the second signature using the identifier of the communication apparatus comprises:

checking, by the communication apparatus, the second signature using the identifier of the communication apparatus, the current system time, and the indication information.

8. The method according to a claim 5, wherein the receiving, by the communication apparatus, a second signature from the network device comprises:

receiving, by the communication apparatus, a message 4 from the network device, wherein the message 4 comprises the second signature.

9. A communication apparatus, wherein the apparatus comprises:

a transceiver, configured to send system information to a terminal device, wherein the system information comprises a first signature of the system information, a first timestamp, and a correspondence between a terminal identifier range and a selection range of a physical random access channel sequence, and the first timestamp identifies a time at which the network device generates the first signature; and receive a message 1 from the terminal device; and a processor, configured to determine a terminal identifier range corresponding to the terminal device based on an identifier of a physical random access channel sequence corresponding to the message 1 and the correspondence between the terminal identifier range and the selection range of the physical random access channel sequence; and sign an identifier of the terminal device and a current system time using a private key corresponding to the network device, to obtain a second signature, wherein the identifier of the terminal device is determined based on the terminal identifier range corresponding to the terminal device, wherein the transceiver is further configured to send the second signature to the terminal device.

10. The apparatus according to claim 9, wherein the transceiver is further configured to:

receive a message 3 from the terminal device, wherein the message 3 comprises indication information, and the indication information indicates that a check performed by the terminal device on the first signature succeeds, and that a difference between a local time of the terminal device and the first timestamp is greater than or equal to a first threshold.

11. The apparatus according to claim 10, wherein the processor is configured to:

sign the identifier of the terminal device, the current system time, and the indication information using the private key corresponding to the network device, to obtain the second signature.

12. The apparatus according to claim 9, wherein the transceiver is configured to:

send a message 4 to the terminal device, wherein the message 4 comprises the second signature.

13. A communication apparatus, comprising:

at least one processor coupled to at least one memory storing instructions and configured to execute the instructions to cause the apparatus to: receive system information from a network device, wherein the system information comprises a first signature of the system information, a first timestamp, and a correspondence between a terminal identifier range and a selection range of a physical random access channel sequence, and the first timestamp identifies a time at which the network device generates the first signature;

based on a determination that a difference between a local time and the first timestamp is greater than or equal to a first threshold and a check on the first signature being successful select a physical random access channel sequence based on an identifier of the apparatus and the correspondence between the terminal identifier range and the selection range of the physical random access channel sequence; and send a message 1 to the network device based on the selected physical random access channel sequence;

receive a second signature from the network device; and verify whether a difference between a second timestamp and the first timestamp is less than a second threshold, wherein the second timestamp identifies a time at which the apparatus receives the second signature; and check the second signature using the identifier of the apparatus and a current system time, wherein the identifier of the apparatus is determined based on a terminal identifier range corresponding to the identifier of the apparatus.

14. The apparatus according to claim 13, wherein the instructions further cause the apparatus to send a message 3 to the network device, wherein the message 3 comprises indication information, and the indication information indicates that a check performed by the apparatus on the first signature succeeds, and that the difference between the local time of the apparatus and the first timestamp is greater than or equal to the first threshold.

15. The apparatus according to claim 14, wherein the instructions further cause the apparatus to check the second signature using the identifier of the apparatus, the current system time, and the indication information.

16. The apparatus according to claim 13, wherein the instructions further cause the apparatus to receive a message 4 from the network device, wherein the message 4 comprises the second signature.

* * * * *